(12) United States Patent
Dayan et al.

(10) Patent No.: US 11,673,690 B2
(45) Date of Patent: Jun. 13, 2023

(54) MODULAR COLLAPSIBLE AND PORTABLE DRONE IN A BOX

(71) Applicant: Easy Aerial Inc., Brooklyn, NY (US)

(72) Inventors: Omri Dayan, Brooklyn, NY (US); Bradley Jomard, New York, NY (US); Ido Gur, New York, NY (US)

(73) Assignee: Easy Aerial Inc., Brooklyn, NY (US)

( * ) Notice: Subject to any disclaimer, the term of this patent is extended or adjusted under 35 U.S.C. 154(b) by 0 days.

(21) Appl. No.: 17/581,014

(22) Filed: Jan. 21, 2022

(65) Prior Publication Data
US 2022/0234757 A1 Jul. 28, 2022

Related U.S. Application Data

(60) Provisional application No. 63/140,477, filed on Jan. 22, 2021.

(51) Int. Cl.
| | |
|---|---|
| *B64F 3/00* | (2006.01) |
| *B64F 1/36* | (2017.01) |
| *B64F 1/22* | (2006.01) |
| *B64C 39/02* | (2023.01) |
| *B64U 10/13* | (2023.01) |
| *B64U 80/70* | (2023.01) |

(52) U.S. Cl.
CPC .............. *B64F 1/36* (2013.01); *B64C 39/022* (2013.01); *B64C 39/024* (2013.01); *B64F 1/222* (2013.01); *B64F 3/00* (2013.01); *B64U 10/13* (2023.01); *B64U 80/70* (2023.01)

(58) Field of Classification Search
CPC .... B64F 3/00; B64C 2201/201; B64C 39/022
See application file for complete search history.

(56) References Cited

U.S. PATENT DOCUMENTS

| | | |
|---|---|---|
| 2,395,528 A | 2/1946 | Andersen |
| 3,035,528 A | 5/1962 | Bolton |
| 5,988,564 A | 11/1999 | Lee |
| 9,302,783 B2 | 4/2016 | Wang |
| 9,387,928 B1 | 7/2016 | Gentry |
| 9,505,494 B1 | 11/2016 | Marlow et al. |
| 9,508,263 B1 | 11/2016 | Teng et al. |
| 9,611,038 B2 | 4/2017 | Dahlstrom |
| 9,618,940 B1 | 4/2017 | Michini et al. |
| 9,880,563 B2 | 1/2018 | Fisher |
| 9,928,749 B2 | 3/2018 | Gil |
| 10,274,952 B2 | 4/2019 | Cantrell |
| 10,287,034 B2 | 5/2019 | Mozer |
| 10,457,421 B2 | 10/2019 | O'Toole |
| 10,577,099 B2 | 3/2020 | Akens |
| 10,761,525 B2 | 9/2020 | Bethke et al. |

(Continued)

FOREIGN PATENT DOCUMENTS

| | | |
|---|---|---|
| CN | 106712160 A | 5/2017 |
| CN | 207748039 U | 8/2018 |
| WO | 2017065411 A1 | 4/2017 |

*Primary Examiner* — Tye William Abell
(74) *Attorney, Agent, or Firm* — Carter, DeLuca & Farrell LLP; George Likourezos; Jason B. Scher

(57) ABSTRACT

A ground station for an unmanned aerial vehicle (UAV) includes a box assembly, a hatch assembly, and a landing pad assembly. The hatch assembly is pivotably coupled to the box assembly. The landing pad assembly is movably coupled to the box assembly and is movably coupled to the hatch assembly.

17 Claims, 24 Drawing Sheets

(56) References Cited

U.S. PATENT DOCUMENTS

| | | |
|---|---|---|
| 10,934,019 B2 | 3/2021 | Stamatovski |
| 11,046,459 B2 | 6/2021 | Stamatovski |
| 11,220,352 B2 | 1/2022 | Stamatovski |
| 2014/0124621 A1 | 5/2014 | Godzdanker |
| 2015/0183528 A1 | 7/2015 | Walsh |
| 2016/0257424 A1 | 9/2016 | Stabler |
| 2016/0257426 A1 | 9/2016 | Mozer |
| 2016/0266579 A1* | 9/2016 | Chen .................... G05D 1/0044 |
| 2016/0286135 A1* | 9/2016 | Baseuny ................ B64D 47/08 |
| 2016/0323751 A1* | 11/2016 | Priest .................... B64C 39/022 |
| 2017/0073084 A1 | 3/2017 | Mozer |
| 2017/0144776 A1 | 5/2017 | Fisher |
| 2017/0158353 A1 | 6/2017 | Schmick |
| 2017/0217323 A1 | 8/2017 | Antonini |
| 2017/0225802 A1* | 8/2017 | Lussier ................... E04H 12/18 |
| 2017/0229022 A1 | 8/2017 | Gurel et al. |
| 2017/0240062 A1 | 8/2017 | Jaiswal |
| 2018/0029723 A1* | 2/2018 | Krauss ...................... B64F 1/12 |
| 2018/0141680 A1 | 5/2018 | Heinonen |
| 2018/0148170 A1* | 5/2018 | Stamatovski ........... B64F 1/222 |
| 2018/0178665 A1 | 6/2018 | Chen |
| 2018/0245365 A1* | 8/2018 | Wankewycz .............. H02J 7/00 |
| 2018/0327091 A1* | 11/2018 | Burks ..................... B64F 1/007 |
| 2019/0002127 A1 | 1/2019 | Straus |
| 2019/0039751 A1 | 2/2019 | Janssen |
| 2019/0100330 A1* | 4/2019 | Cheng ....................... B64F 1/22 |
| 2019/0106224 A1* | 4/2019 | Nishikawa ............. B64D 47/08 |
| 2019/0245365 A1 | 8/2019 | Farrahi Moghaddam |
| 2019/0308724 A1* | 10/2019 | Cooper .................. B64F 1/222 |
| 2020/0165008 A1 | 5/2020 | Krauss |
| 2020/0207484 A1 | 7/2020 | Foggia |
| 2021/0070468 A1* | 3/2021 | Svirsky .................. B64F 1/222 |

\* cited by examiner

MODULAR COLLAPSIBLE AND PORTABLE DRONE IN A BOX

CROSS-REFERENCE TO RELATED APPLICATIONS

This application claims the benefit of U.S. Patent Application Ser. No. 63/140,477, filed Jan. 22, 2021, the entire contents of which are hereby incorporated by reference.

TECHNICAL FIELD

This disclosure relates to operable ground stations for unmanned aerial vehicle (UAV) systems and methods for housing, charging, deploying, and controlling UAV systems.

BACKGROUND

Currently, ground stations in the form of drone-in-a-box platforms are constrained by two key variables: their design to coordinate with a particular drone type and the size of the landing platforms.

Regarding the particular drone type, there are tethered drone-in-a-box methods that provide an sUAS ground station capable of housing, powering, and controlling the sUAS, and there are non-tethered methods that provide the same with the addition of charging. However, each method/platform is designed to be one-dimensionally operational—a tether equipped ground station for a tether equipped sUAS, or a non-tethered ground station for non-tethered sUAS. While these systems operate well, their lack of modularity is a constraint on their operational uses and situational enhancement.

Regarding the landing platform size, current drone-in-a-box systems, which autonomously land, store, and charge the sUAS, necessitate large landing platforms. This is to accommodate errors in autonomous precision landing and to provide a mechanism for charging the sUAS. In many cases, charging is affected by a mechanism that centers the sUAS, or engages the sUAS with the charging mechanism. This active mechanism must span the length and width of the landing pad in order to engage the sUAS no matter where it lands on the landing pad. The size (length and width) of the ground station is thus constrained by precision landing tolerance which is accommodated by large landing pads with equally large centering/charging mechanisms. The size and weight of these systems reduces the portability of the system.

SUMMARY

According to an aspect of this disclosure, a ground station for an unmanned aerial vehicle (UAV) includes a box assembly, a hatch assembly, and a landing pad assembly. The hatch assembly is pivotably coupled to the box assembly. The landing pad assembly is movably, coupled to the box assembly and to the hatch assembly.

In aspects, the landing pad assembly may be positioned to move between a collapsed position within a periphery of the box assembly to an extended position beyond the periphery of the box assembly. The landing pad assembly may include a landing pad and auxiliary panels coupled to the landing pad. The auxiliary panels may be pivotably coupled to the landing pad. The auxiliary panels may be coupled to corner panels that couple the auxiliary panels together. The corner panels may be movable relative to the auxiliary panels. At least one of the auxiliary panels may be coupled to the hatch assembly.

In aspects, the ground station may further include at least one actuator coupled to the landing pad assembly and the box assembly. The actuator may be actuatable to cause the landing pad assembly to move relative to the box assembly.

In aspects, the landing pad assembly may be pivotably coupled to the hatch assembly by at least one hinge assembly. The at least one hinge assembly may be slidably movable relative to the hatch assembly and the landing pad assembly.

According to another aspect, this disclosure is directed to a ground station system. The ground station system includes an unmanned aerial vehicle (UAV) and a ground station configured to support the UAV. The ground station includes a box assembly, a hatch assembly, and a landing pad assembly. The hatch assembly is pivotably coupled to the box assembly. The landing pad assembly is movably coupled to the box assembly to selectively store the UAV in the box assembly or deploy the UAV from the box assembly.

In aspects, the UAV may be tethered to the ground station.

Other aspects, features, and advantages will be apparent from the description, the drawings, and the claims that follow.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying figures of which.

Figure 1:
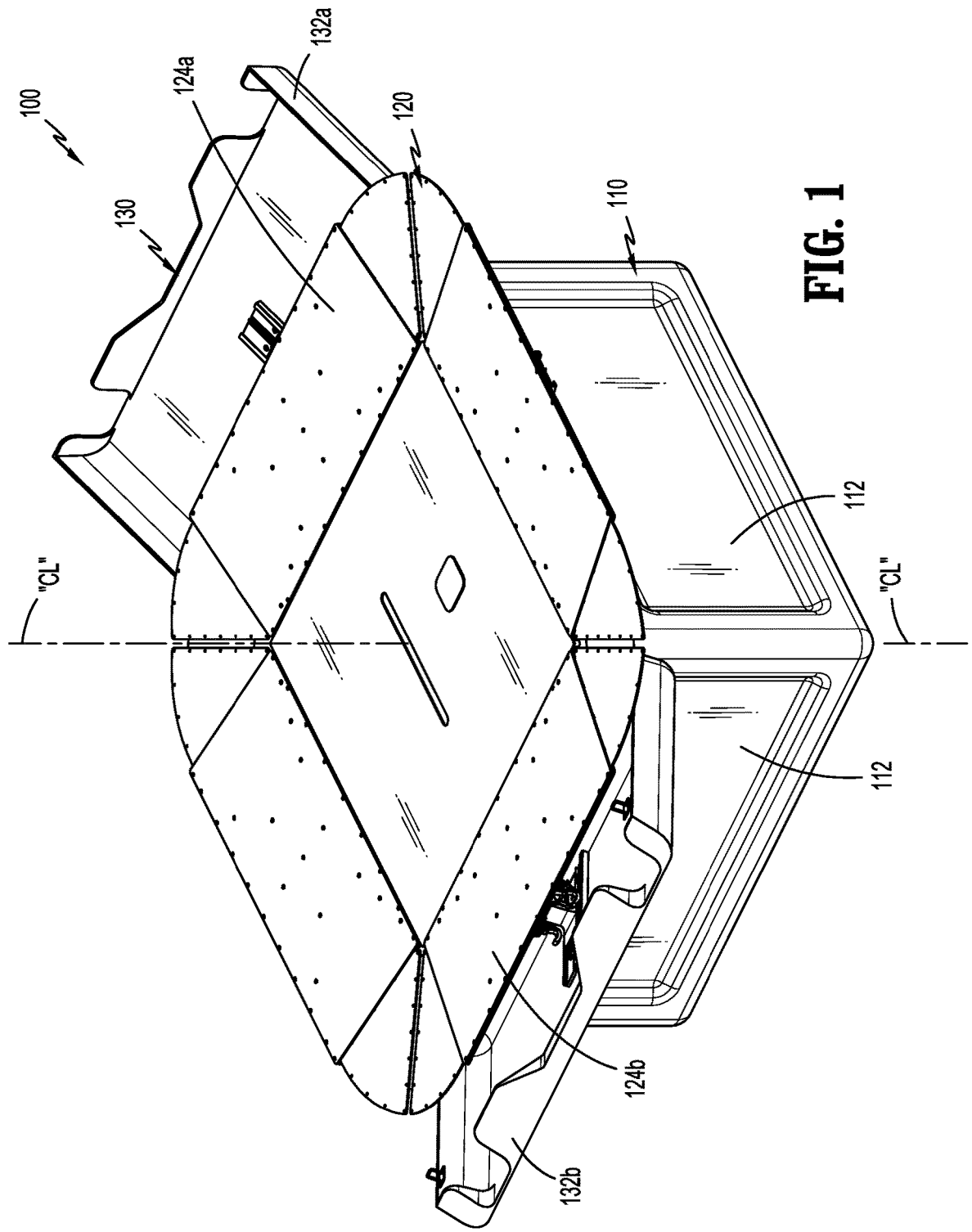
FIG. 1 is a perspective view of a ground station for an unmanned aerial vehicle (UAV) system in accordance with the principles of this disclosure, the ground station shown in an open position.

Further details and aspects of exemplary aspects of the disclosure are described in more detail below with reference to the appended figures. Any of the above aspects and aspects of the disclosure may be combined without departing from the scope of the disclosure.

DETAILED DESCRIPTION

Although illustrative systems of this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the figures, and specific language will be used to describe the same. It will nevertheless be understood that no limitation of the scope of this disclosure is thereby intended. Any alterations and further modifications of this disclosure features illustrated herein, and any additional applications of the principles of this disclosure as illustrated herein, which would occur to one skilled in the relevant art and having possession of this disclosure, are to be considered within the scope of this disclosure.

In the following description, well-known functions or constructions are not described in detail to avoid obscuring the present disclosure in unnecessary detail.

Generally, this disclosure is directed to devices and methods that provide a multipurpose ground station (e.g., drone-in-a-box) with a landing pad assembly that is movable between extended and collapsed positions to enable unmanned aerial vehicle (UAV) systems to be housed, charged, deployed, controlled (e.g., autonomously), etc. by the ground station. Such UAV systems may be tethered, non-tethered, and/or continuous flight drone systems. For a more detailed discussion of such UAV systems, reference may be made, for example, to U.S. Pat. No. 11,220,335, issued Jan. 11, 2022, and U.S. patent application Ser. No. 16/928,195, filed Jul. 14, 2020, the entire contents of each of which are incorporated herein by reference.

In aspects, the landing pad assembly of the disclosed ground station is configured to center the UAV automatically and passively upon closing the ground station. The ground station can be rugged, military grade, and ultra-portable. In aspects, size of the ground station may be only slightly larger than the UAV (e.g., small, unmanned aircraft system —sUAS) the ground station houses. These characteristics enable integration of a drone-in-a-box platform into medium and large unmanned ground vehicles, which have limited space.

Briefly, the disclosed ground station is configurable to house any number of sUAS platform types—specifically a) tethered sUAS and their tether mechanisms, b) optionally tethered sUAS, c) non-tethered sUAS, and d) continuous flight systems enabled by housing multiple sUAS inside the same ground station. The proposed solution is configurable to store, charge, deploy and autonomously operate sUAS of these types within the same sized, ultra-portable, ruggedized, and military grade ground station. The size (e.g., length and width) of the ground station is constrained only by the size of the sUAS it houses. This is in contrast to the current methods which are constrained by landing precision and centering/charging mechanism. This is achieved through a collapsible and folding landing pad assembly.

With reference to FIGS. 1-26, the disclosed ground station is generally referred to as ground station 100.

As seen in FIGS. 1-6, ground station 100 includes a box assembly 110, a landing pad assembly 120 movably supported in box assembly 110, and a hatch assembly 130 coupled to landing pad assembly 120 and box assembly 110.

Box assembly 110 of ground station 100 includes outer box walls 112 and a frame assembly 114 supported within outer box walls 112. Two of outer box walls 112 support an electronic lock 116 on an upper portion thereof for selective locking engagement with hatch assembly 130.

Figure 6:
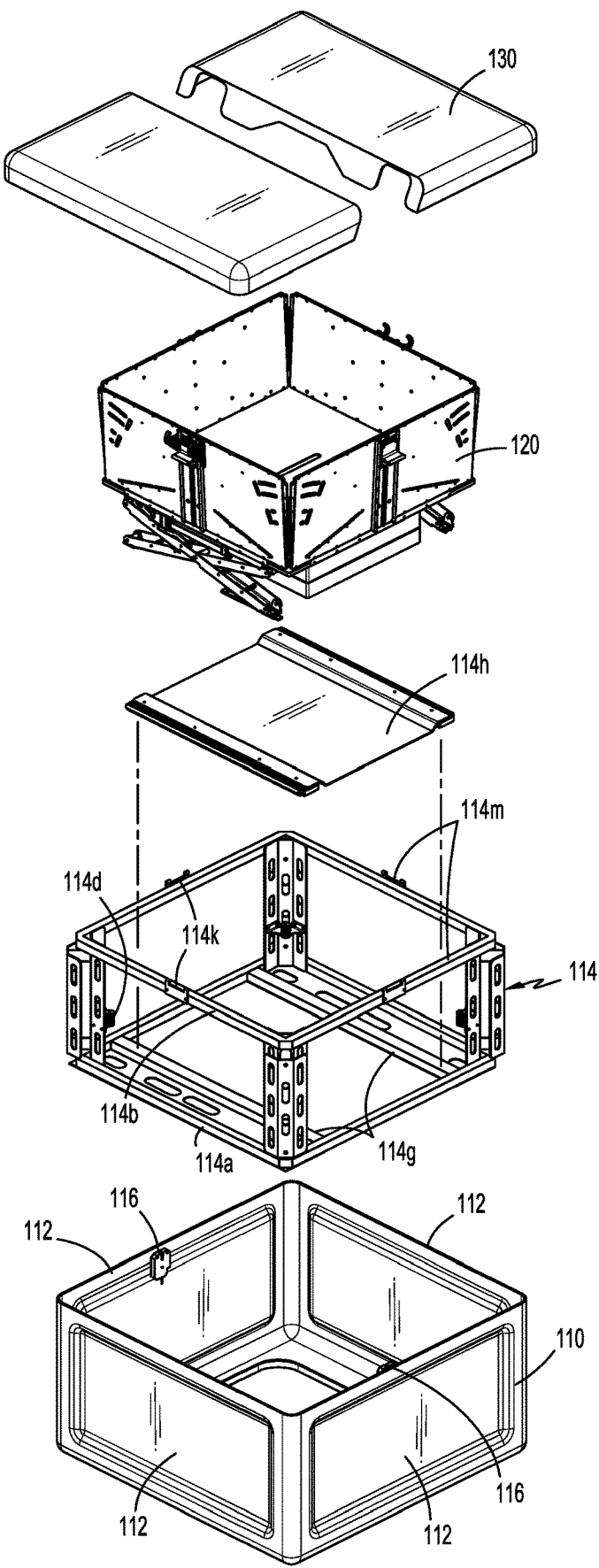
FIG. 6 is a perspective view, with parts separated, of the ground station of FIGS. 1 and 2.
Figure 11:
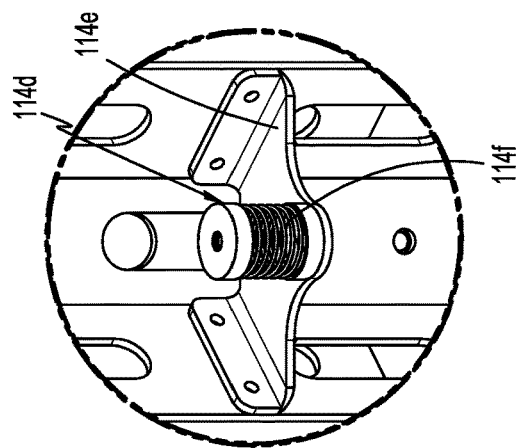
FIG. 11 is an enlarged, perspective view of the indicated area of detail shown in FIG. 10.
Figure 10:
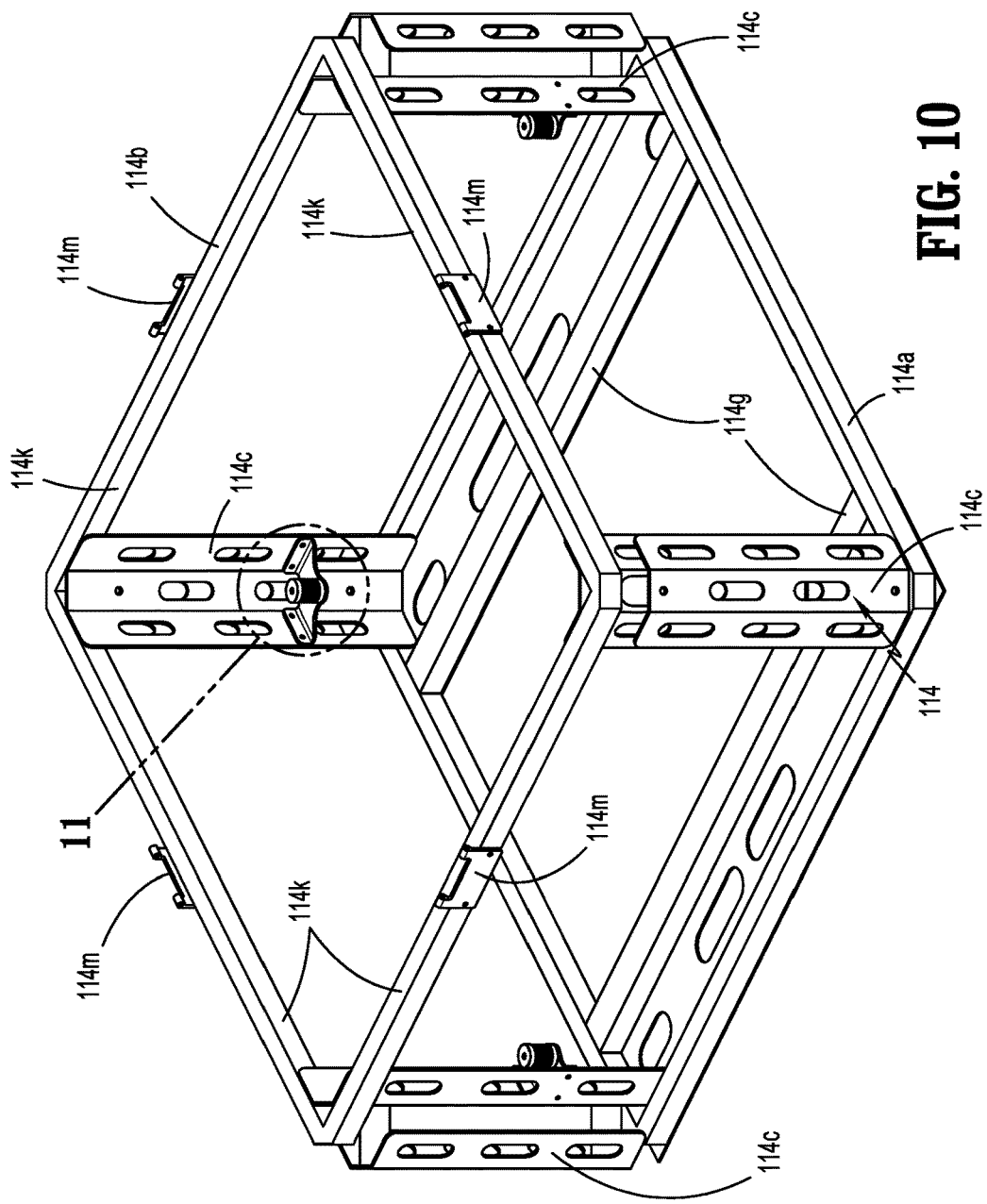
FIG. 10 is a perspective view of a frame assembly of the ground station of FIGS. 1 and 2.
Figure 12:
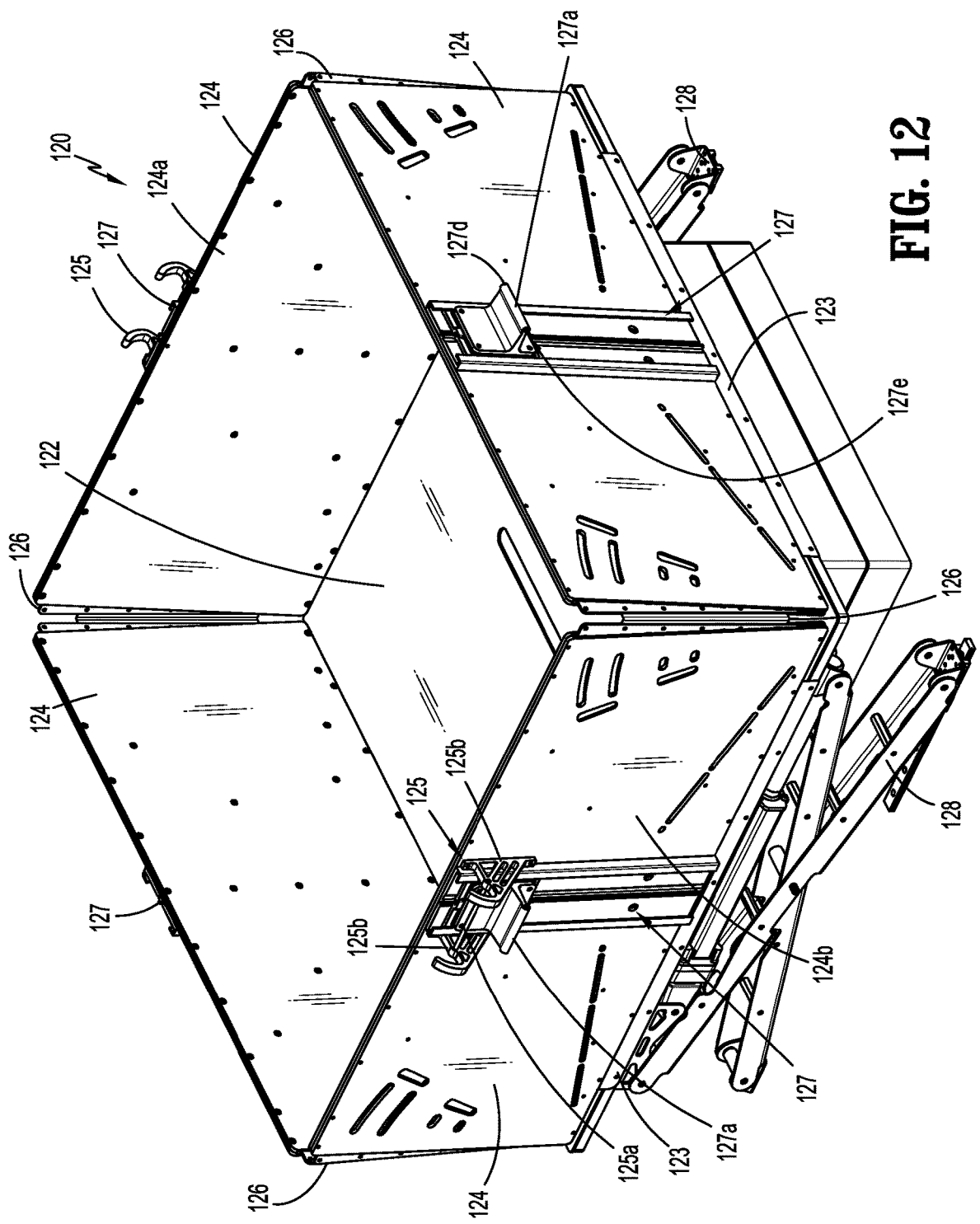
FIG. 12 is a perspective view of a landing pad system of the ground station of FIGS. 1 and 2, the landing pad system shown in a collapsed position.
Figure 13:
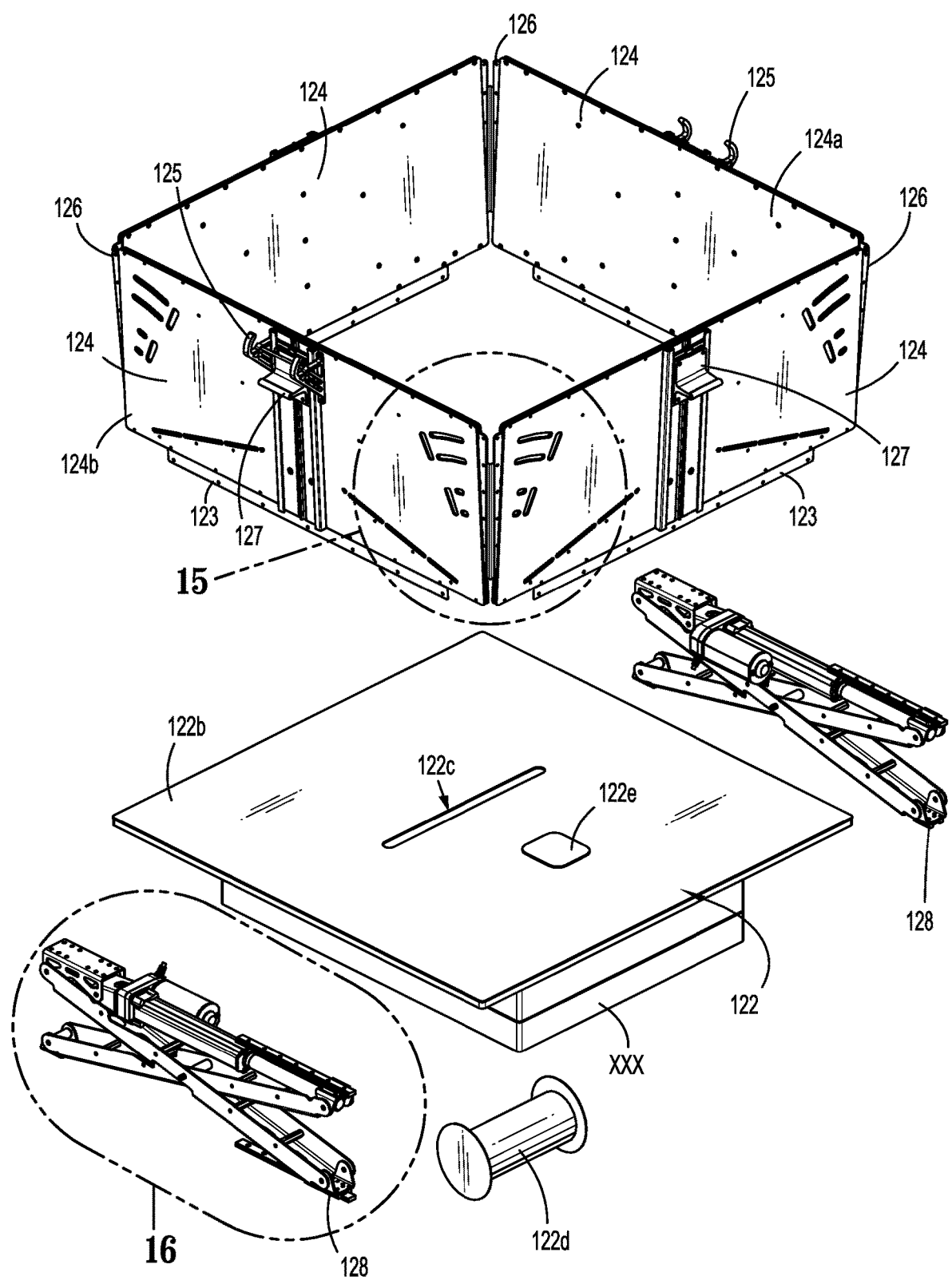
FIG. 13 is a perspective view of the landing pad system of FIG. 12 with parts thereof shown separated.
Figure 14:
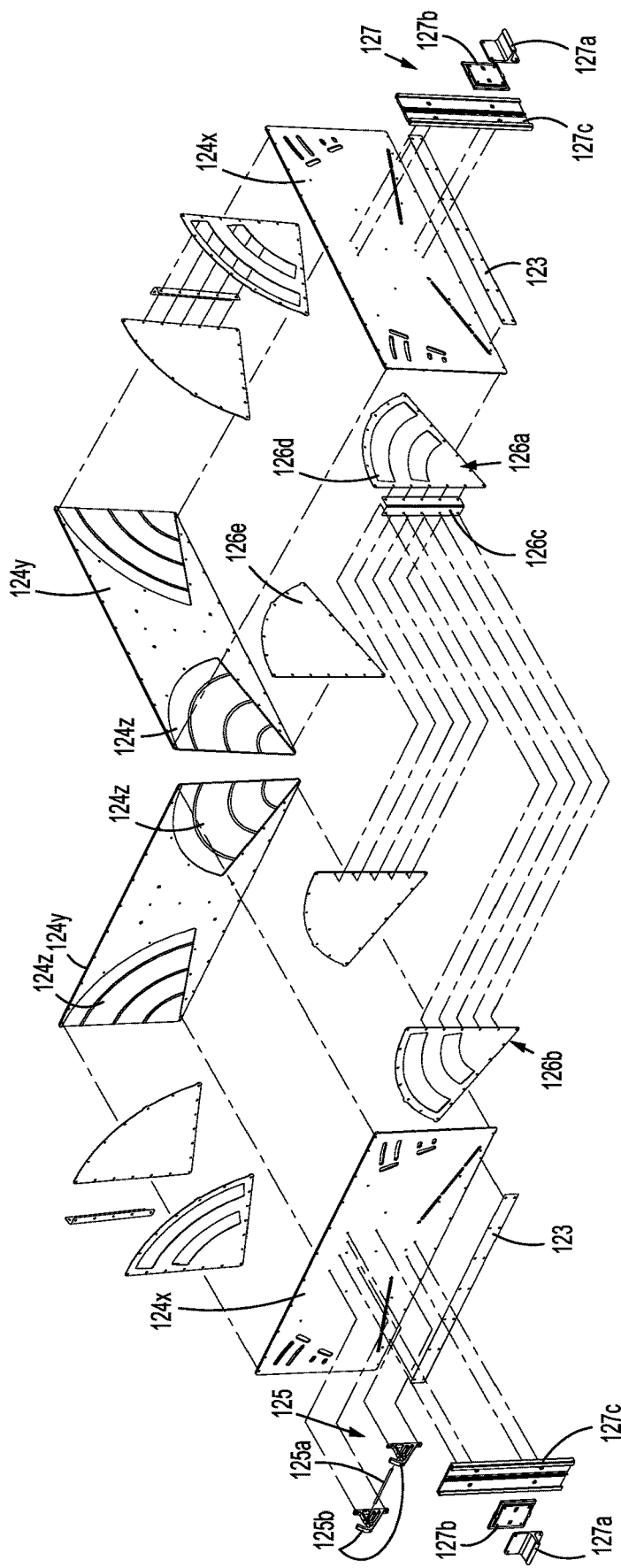
FIG. 14 is a perspective view, with parts separated, of portions of a panel assembly of the landing pad system of FIG. 12.
Figure 15:
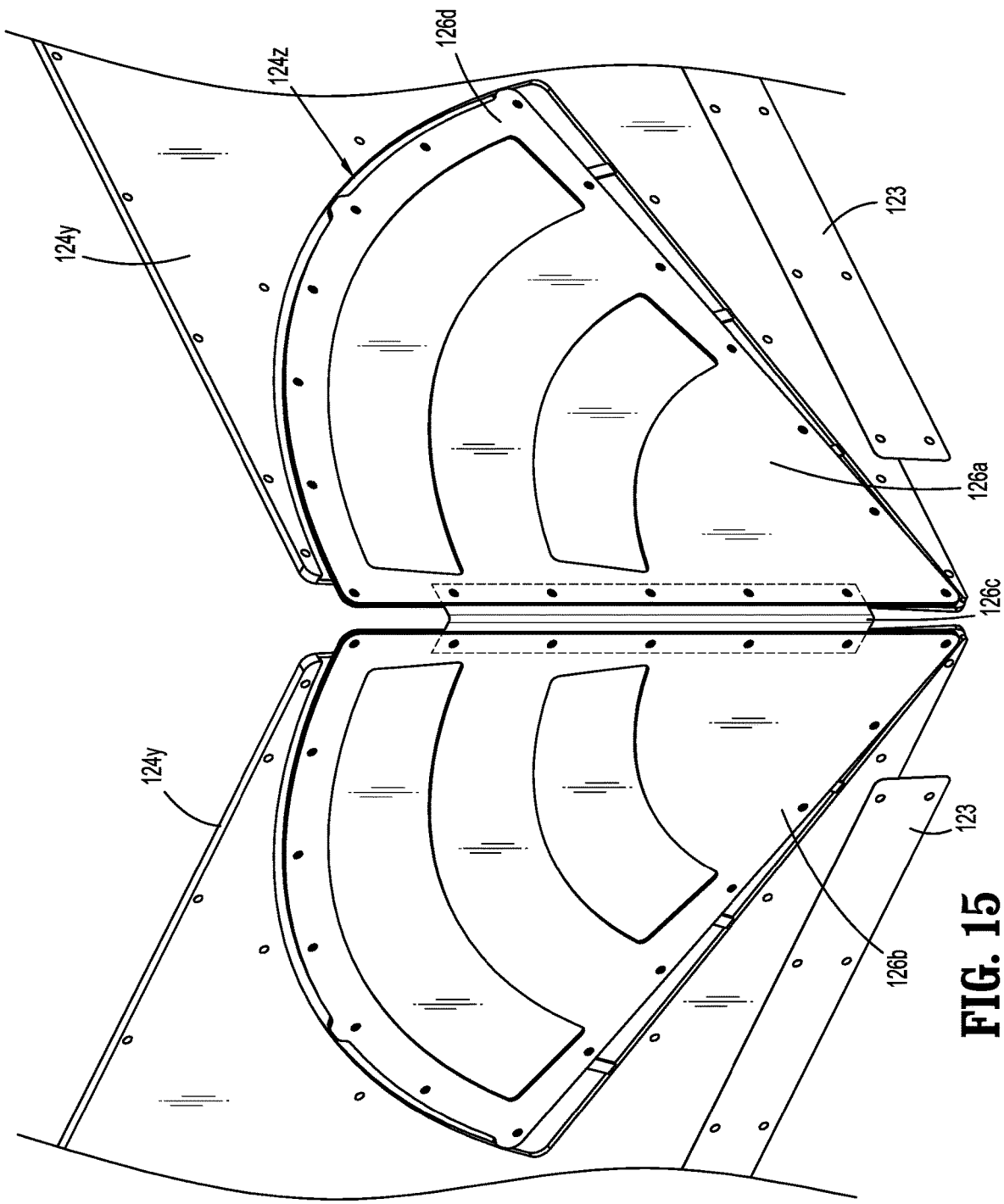
FIGS. 15 and 16 are enlarged, perspective views of the indicated areas of detail shown in FIG. 13.
Figure 16:
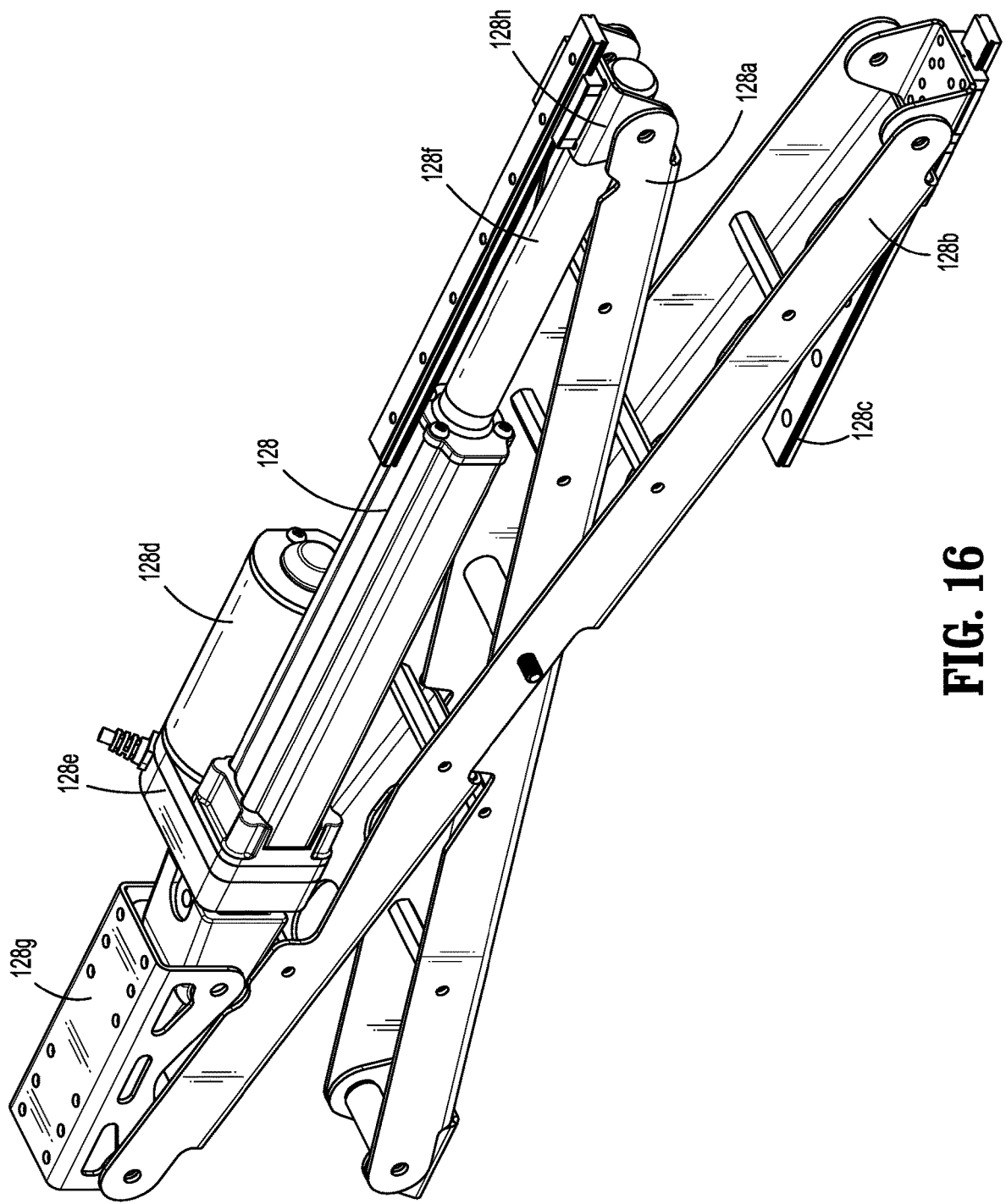
Figure 17:
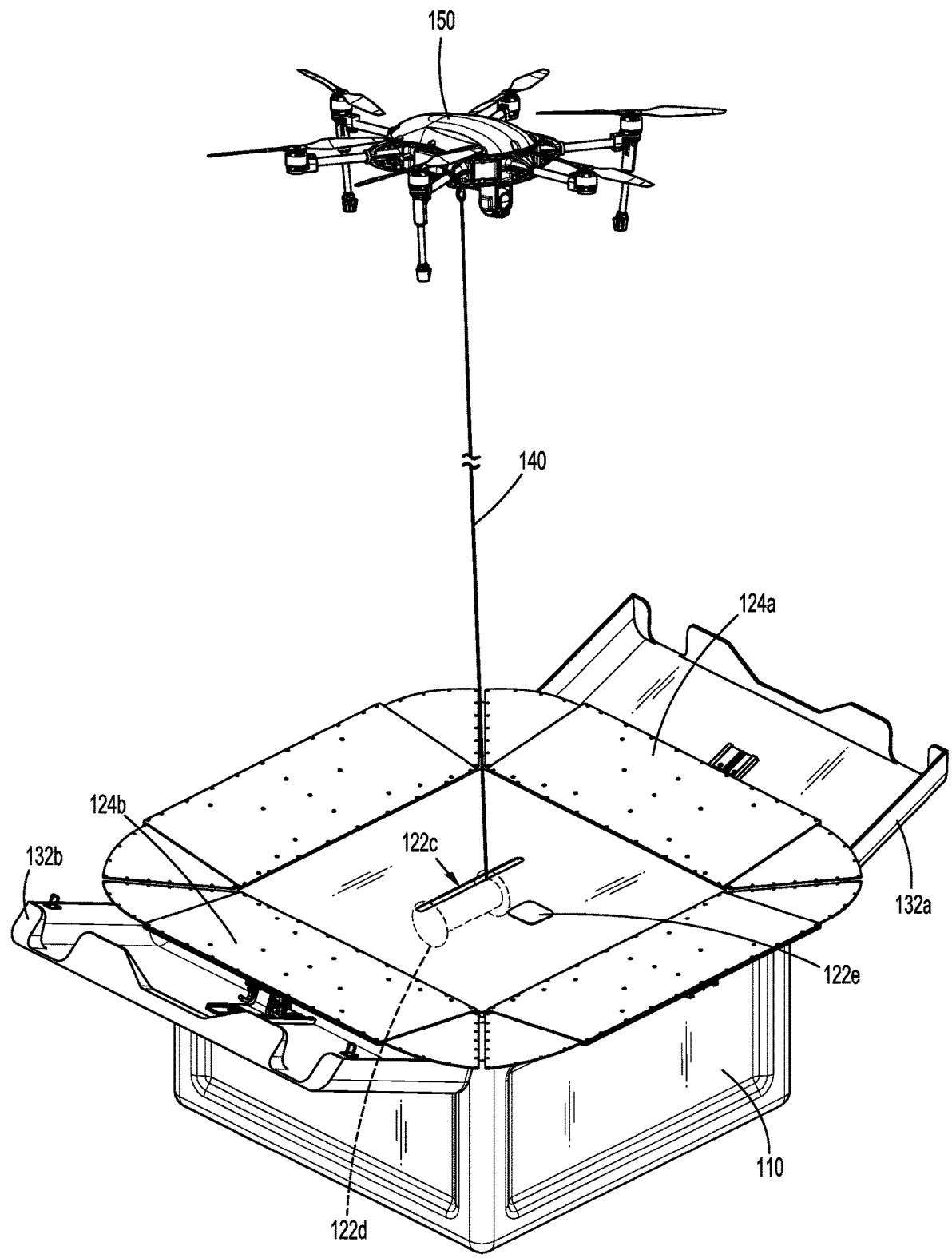
FIGS. 17 and 18 are progressive views illustrating a UAV system moving between flying and landing positions relative to the ground station of FIG. 1 when the ground station is disposed in the open position.
Figure 18:
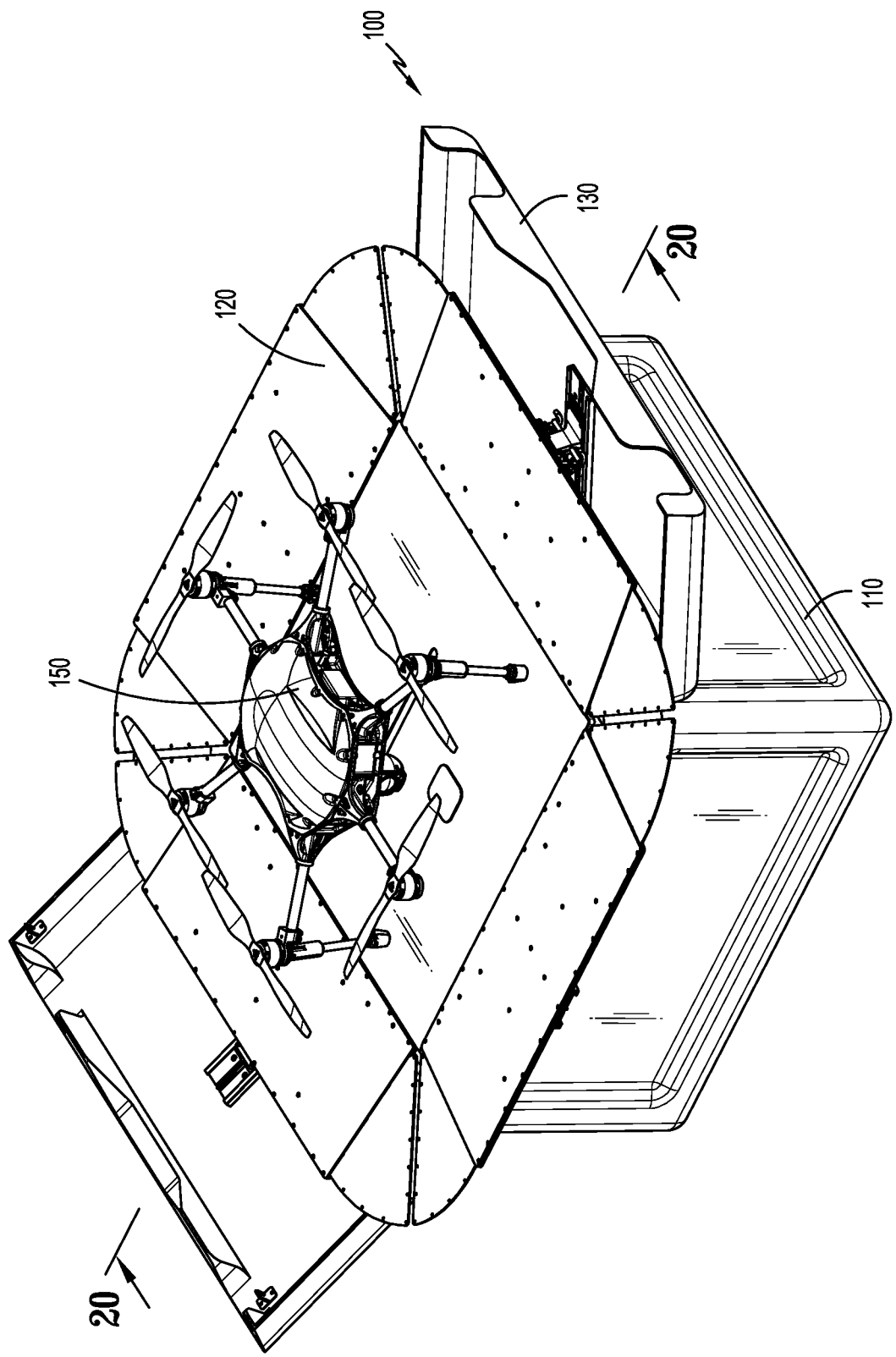
Figure 19:
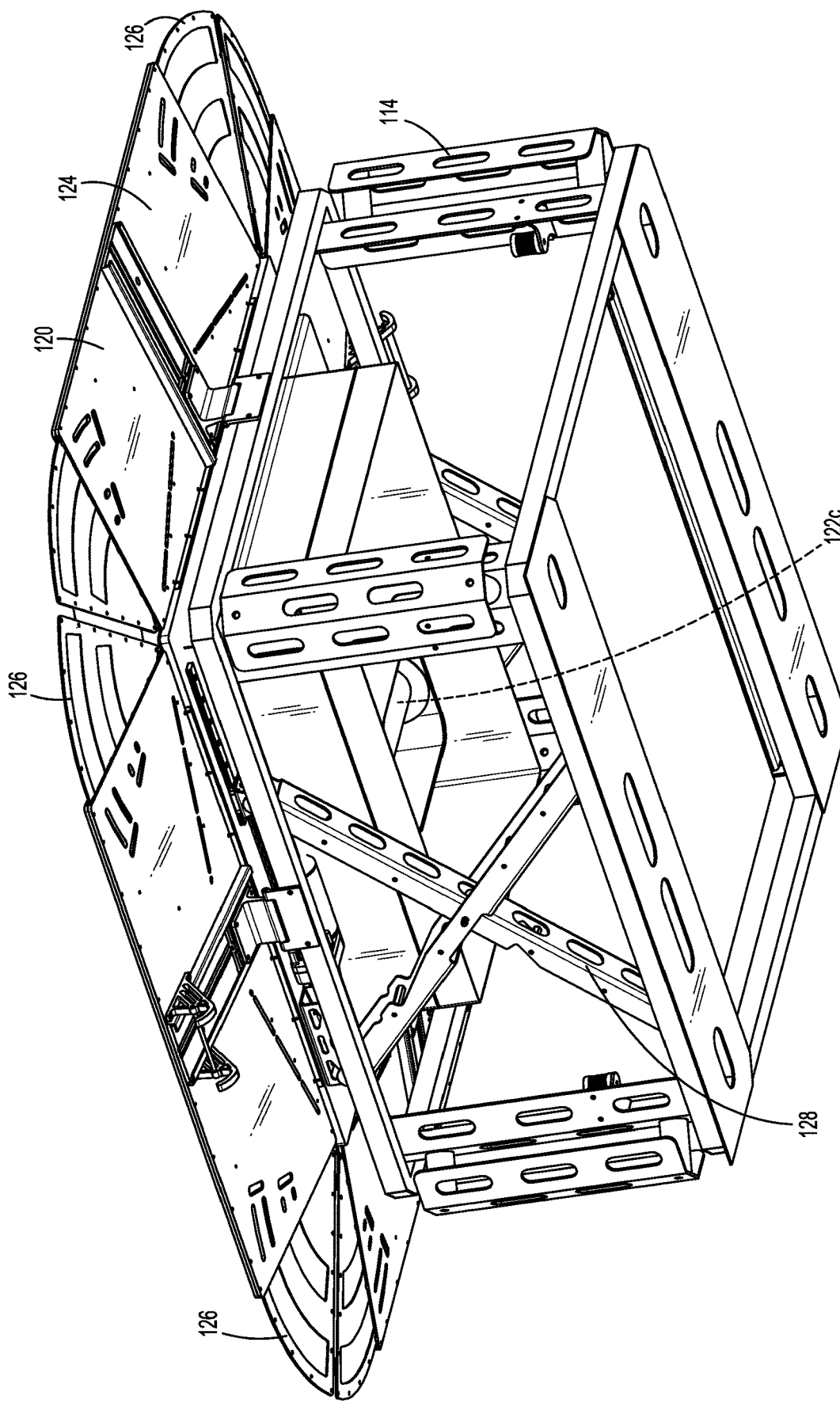
FIG. 19 is a bottom, perspective view of the ground station of FIG. 1 with portions thereof removed for clarity.
Figure 20:
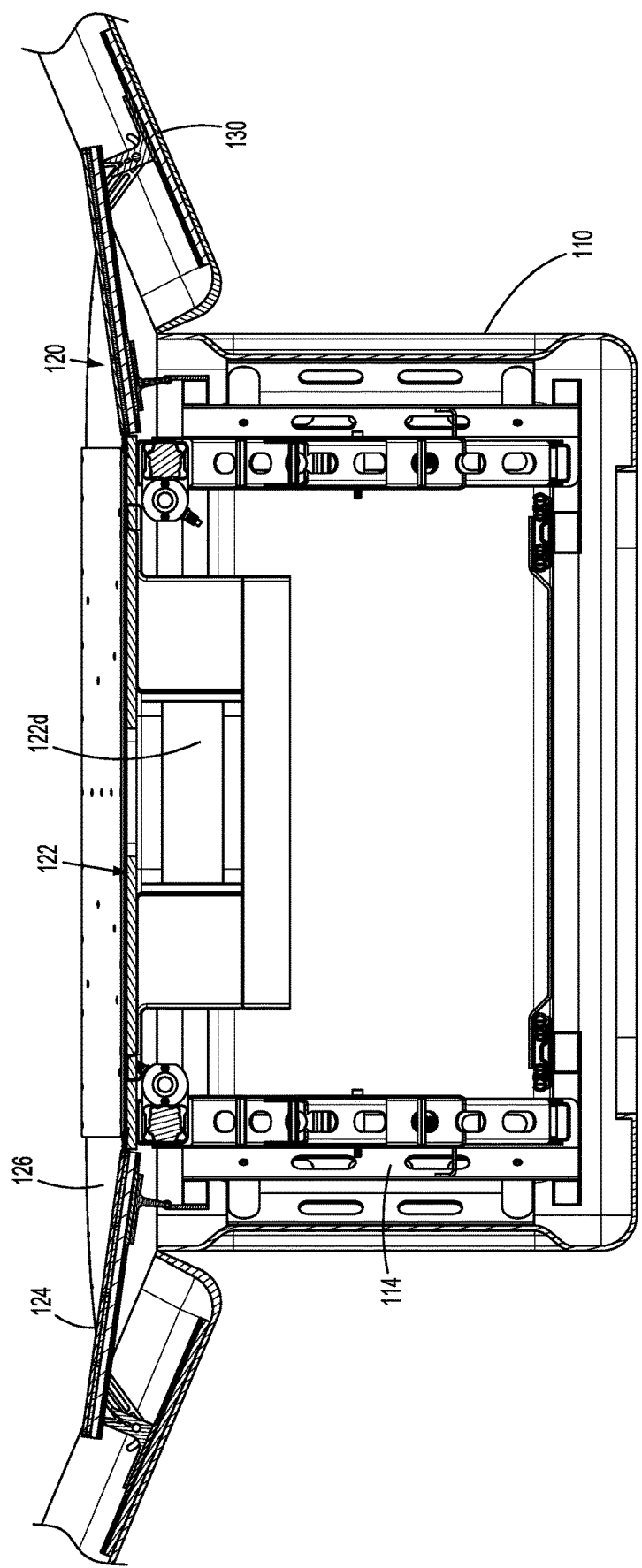
FIG. 20 is a cross-sectional view of FIG. 18 as taken along section line 20-20, the UAV system being removed for clarity.
Figure 21:
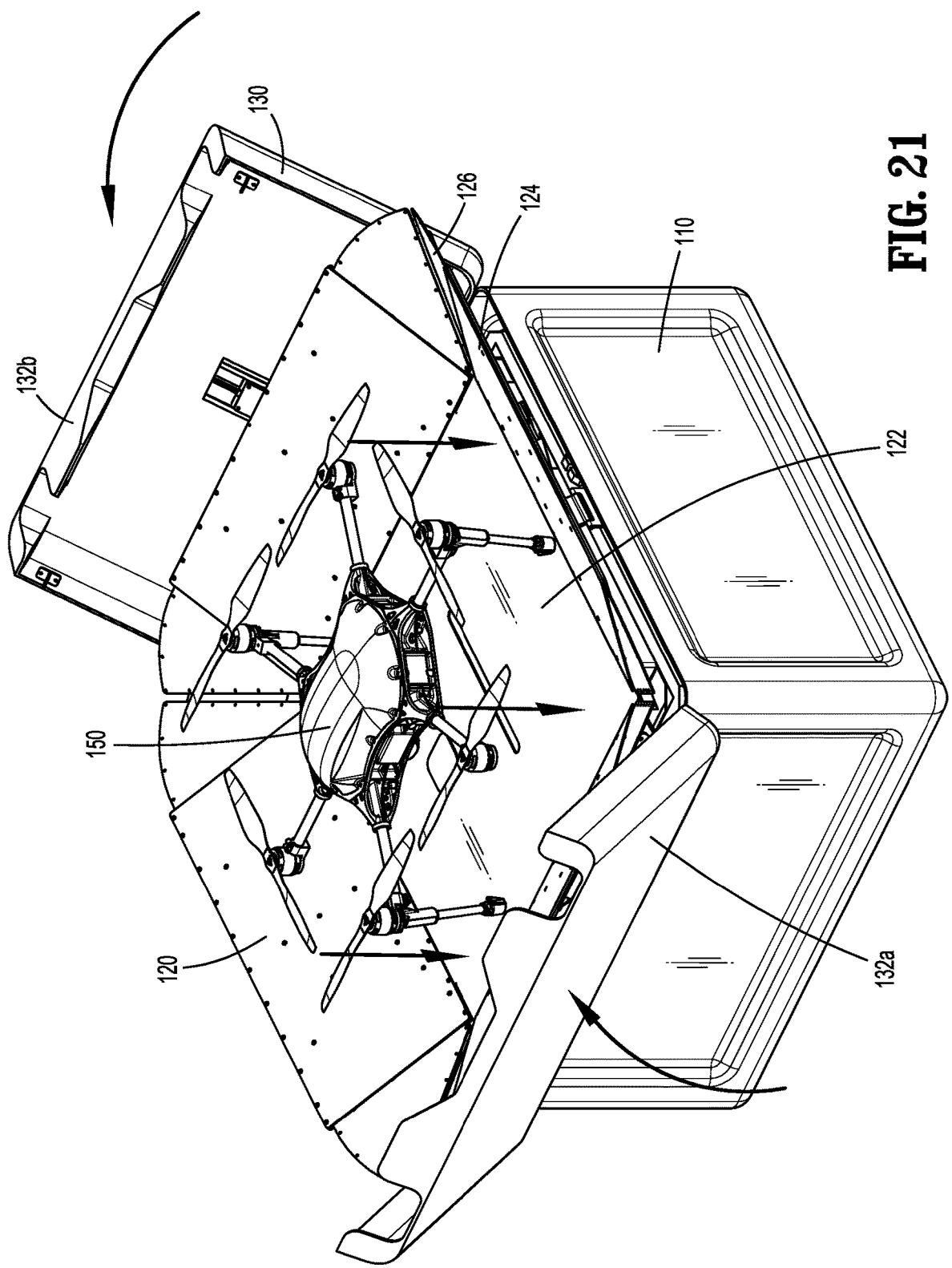
FIGS. 21-26 are progressive views illustrating the UAV system landing in the ground station and the ground station moving from the open position to the closed position to enclose the UAV system within the ground station.
Figure 22:
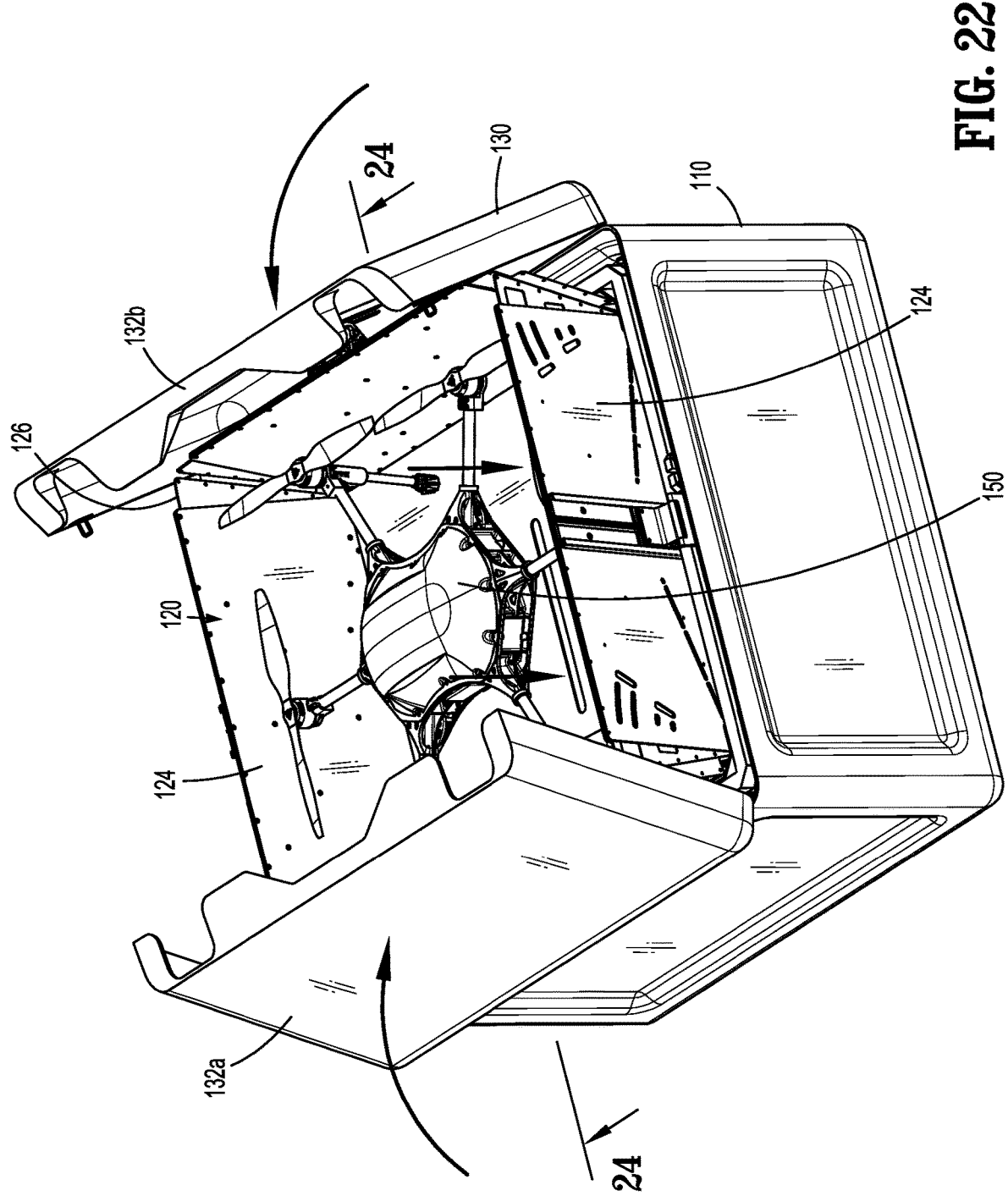
Figure 23:
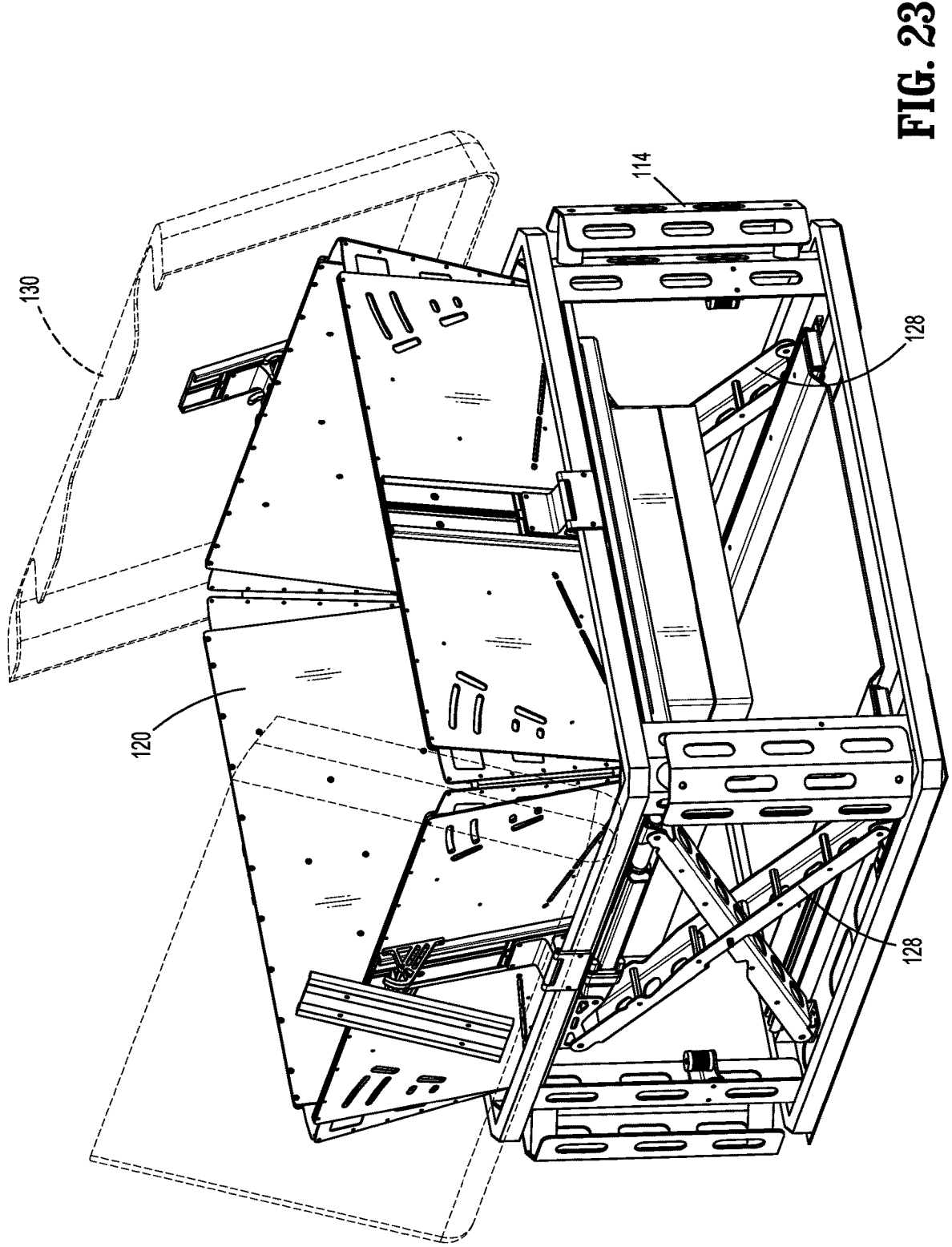
Figure 24:
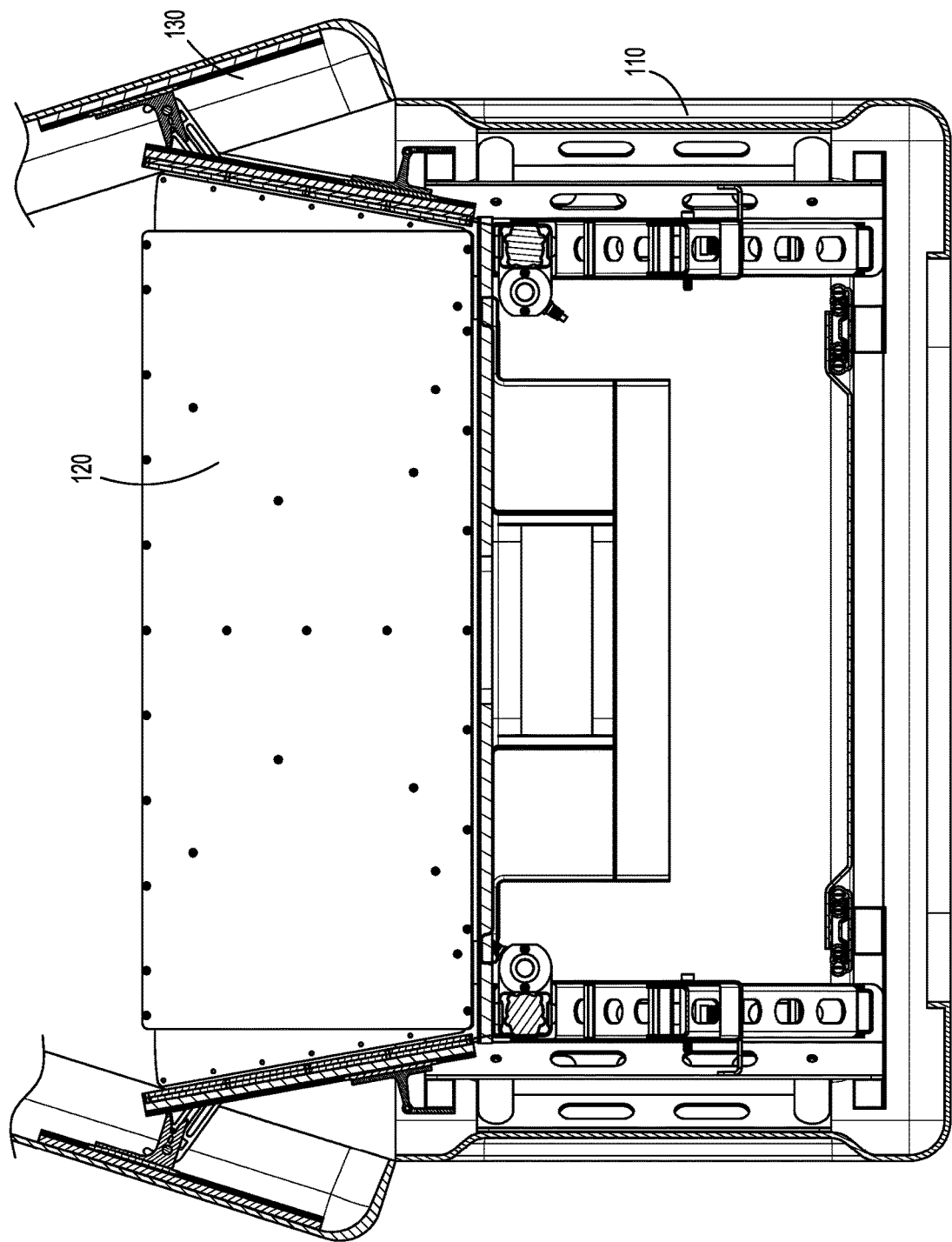
Figure 25:
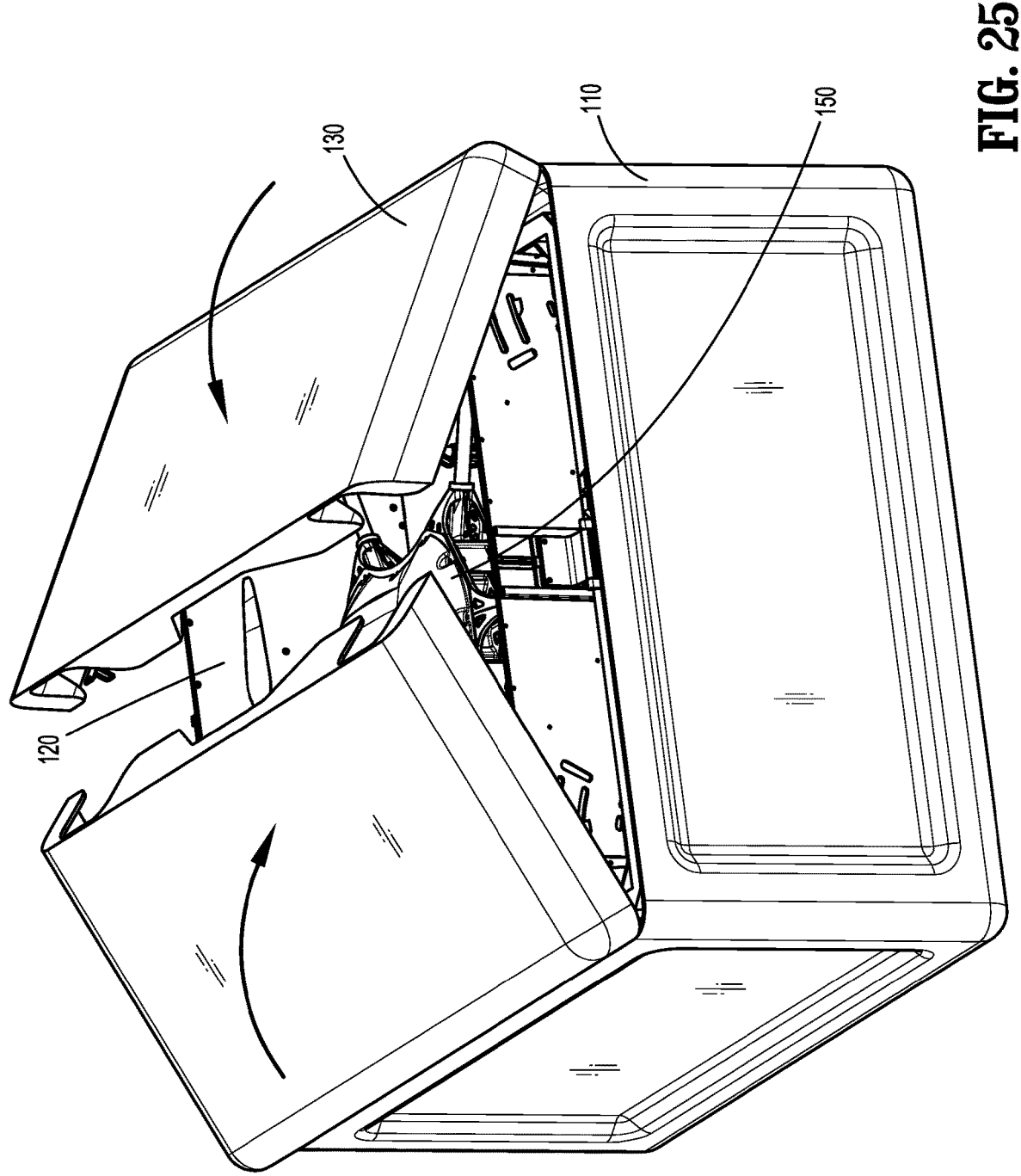
Figure 26:
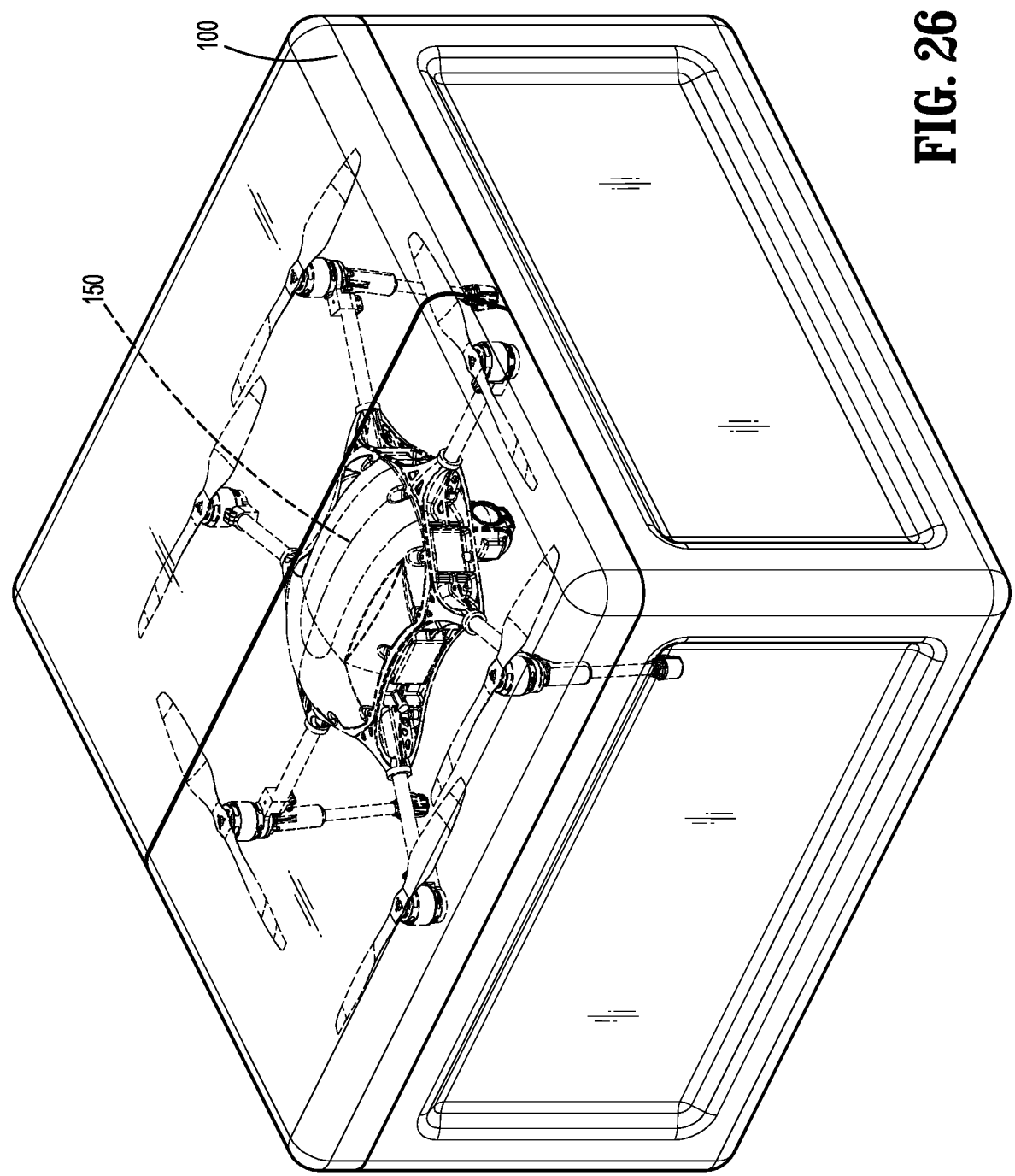

With reference to FIGS. 6, 10, and 11, frame assembly 114 of box assembly 110 includes a base 114a, a top bar 114b, and corner bars 114c that couple base 114a to top bar 114b. Corner bars 114c support spring assemblies 114d thereon. Spring assemblies 114d include a mounting bracket 114e and a spring 114f (e.g., a compression spring) that is coupled to mounting bracket 114e to limit an amount landing pad assembly 120 can collapse into box assembly 110 when landing pad assembly 120 retracts into box assembly 110. Mounting bracket 114e connects to sidewalls of corner bars 114c at a position spaced from base and top bars 114a, 114b, but closer to base 114a. Base 114a includes mounting beams 114g that support a pan 114h. Top bar 114b includes interconnected segments 114k (e.g., four) that each support bar brackets 114m on intermediate portions (e.g., central) thereof.

Figure 2:
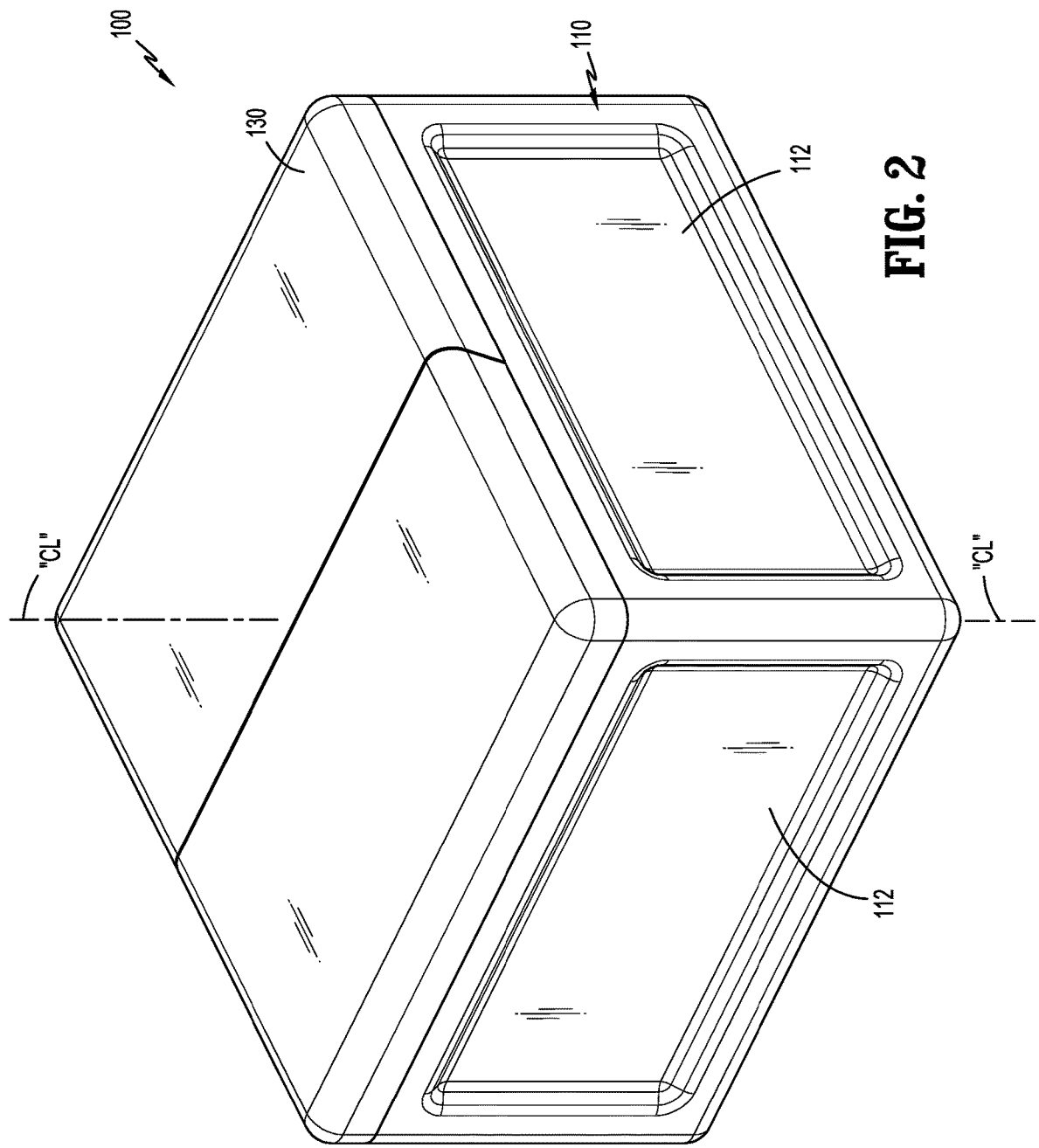
FIG. 2 is a perspective view of the ground station of FIG. 1 with the ground station shown in a closed position.
Figure 7:
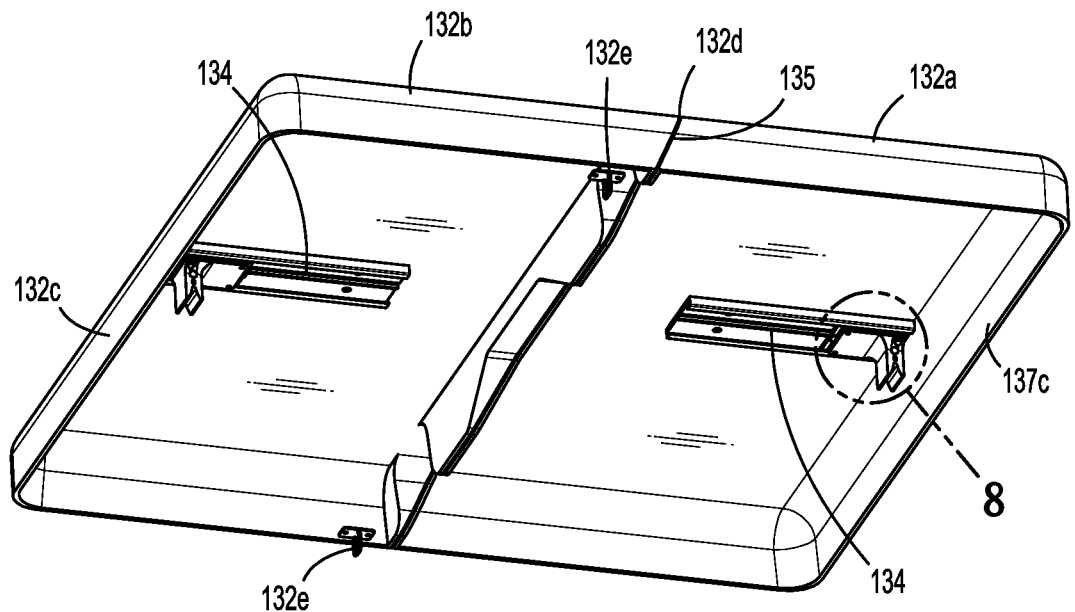
FIG. 7 is a bottom, perspective view of a hatch system of the ground station of FIGS. 1 and 2.

Referring now to FIG. 7, hatch assembly 130 of ground station 100 includes doors 132 (e.g., a first door 132a and a second door 132b) that support female sliding hinge assemblies 134. First and second doors 132a, 132b include an outer end portion 132c and an inner end portion 132d. Inner end portion 132d includes an angled interface 135 to enable inner end portions 132d of first and second doors 132a, 132b to cooperate with one another to selectively maintain doors 132 in a locked position. In particular, second door 132b includes hooks 132e that are configured to engage and interlock with electronic lock 116 of box assembly 110 to enable electronic lock 116 to lock first door 132a of hatch assembly 130 in a closed position (FIG. 2). By virtue of the angled interface 135, second door 132b prevents first door 132a from opening until after second door 132b is unlocked and moves toward an open position.

Figure 8:
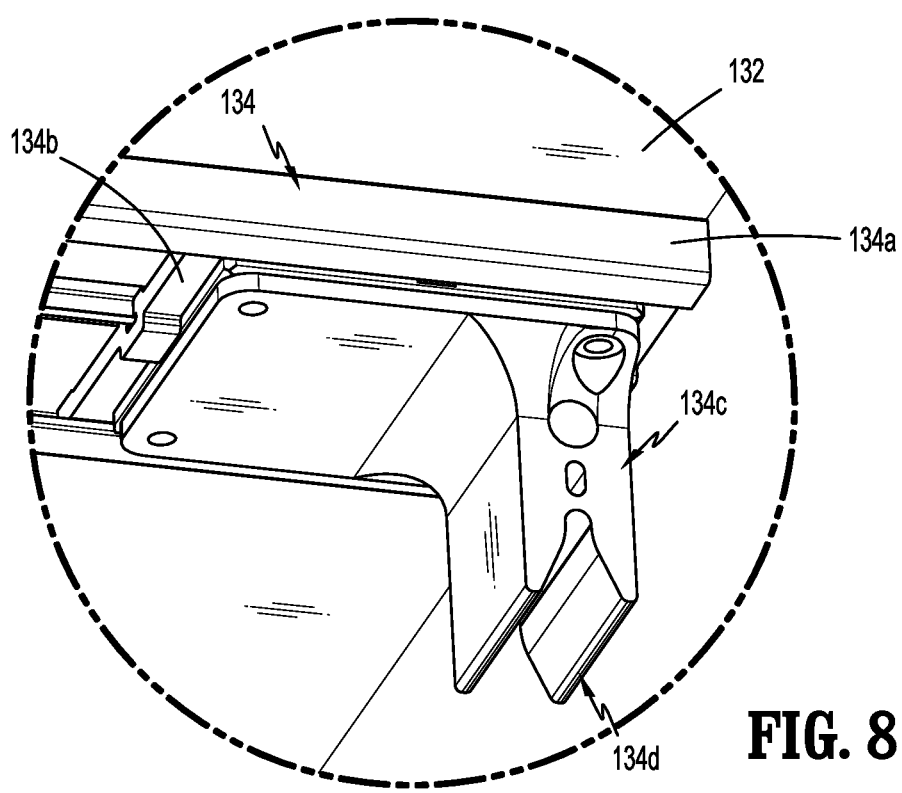
FIG. 8 is an enlarged, perspective view of the indicated area of detail shown in FIG. 7.
Figure 9:
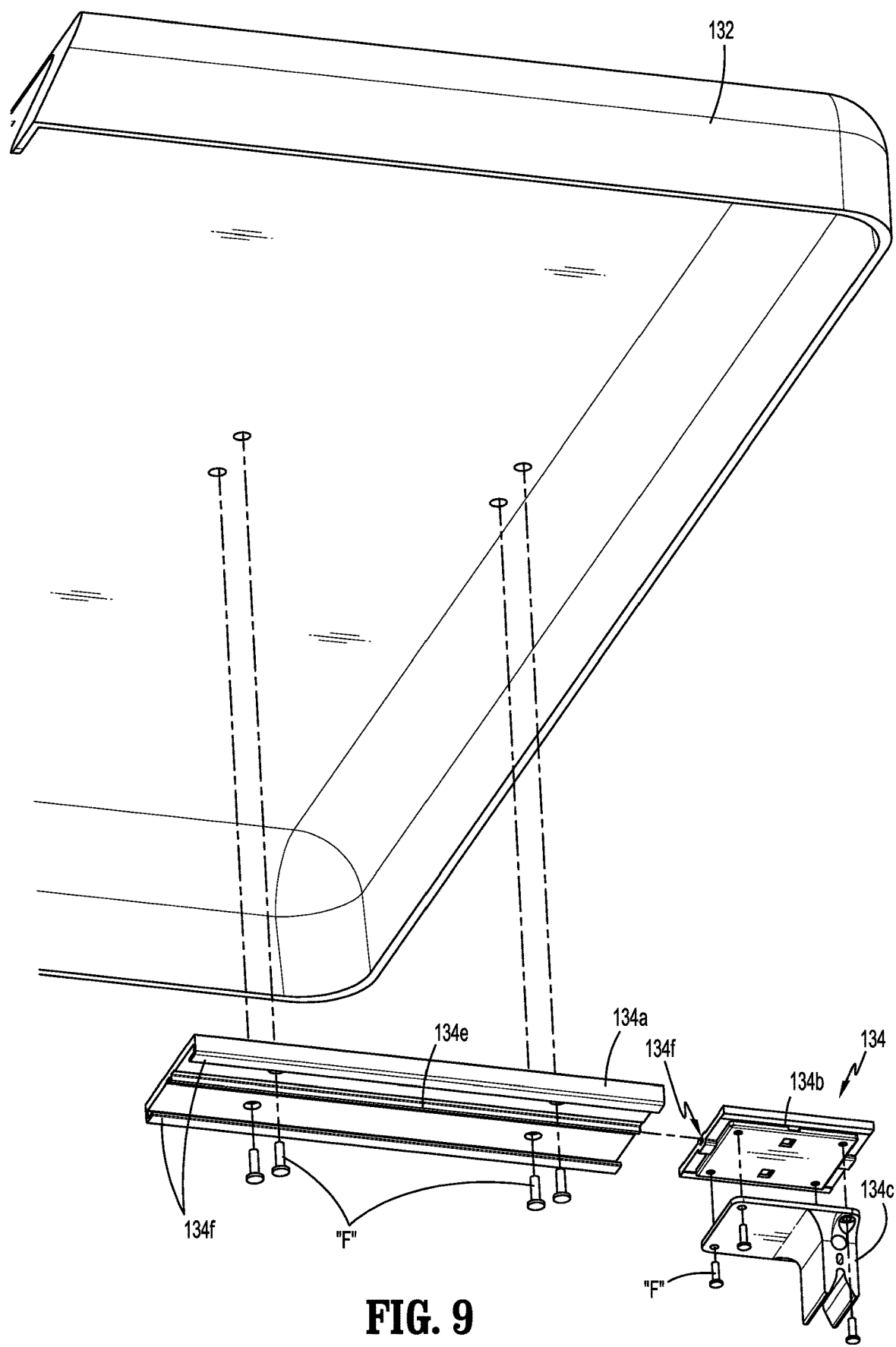
FIG. 9 is an enlarged perspective view of a portion of the hatch system with parts thereof shown separated.

As seen in FIGS. 8 and 9, each female sliding hinge assembly 134 of hatch assembly 130 includes a track 134a mounted to an underside of a respective one of first and second doors 132a, 132b (e.g., via fasteners "F" or any other suitable mounting technique such as adhesion, welding, etc.), a slider 134b slidably mounted on track 134a, and a female hinge 134c secured to slider 134b (e.g., via fasteners "F" or any other suitable mounting technique). Female hinge 134c depends from slider 134b and defines an open pin channel 134d on a free end portion thereof. Track 134a includes a guide rib 134e that slidably engages a guide channel 134f defined through slider 134b as slider 134b slides along guide arms 134f extending along track 134a for supporting slider 134b and female hinge 134c on track 134a.

Referring now to FIGS. 12-15, landing pad assembly 120 of ground station 100 includes a landing pad 122, four rigid auxiliary panels 124, four hinged corner panels 126, and actuators 128 that enable landing pad assembly 120 to move between collapsed and extended positions.

Landing pad 122 of landing pad assembly 120 includes pad base 122a and a pad 122b mounted on pad base 122a. Pad 122b defines a tether line slot 122c therethrough (e.g., centrally disposed on pad 122b). Pad base 122a supports a tether spool 122d therein that is coupled to a tether 140 secured to a UAV 150 (see FIG. 17). Pad 122b further includes an infrared beacon 122d mounted thereon.

Each auxiliary panel 124 of landing pad assembly 120 includes an outer face plate 124x and an inner face plate 124y that define corner panel slots 124z therebetween for slidably receiving corner panels 126 therein. In particular, corner panels 126 are slidably movable into and/or out of corner panel slots 124z of auxiliary panels 124 as landing pad assembly 120 moves between the collapsed and extended positions thereof. Auxiliary panels 124 are pivotally connected to landing pad 122 by hinge bars 123 secured to a lower portion of each auxiliary panel 124.

Two of the auxiliary panels 124 of landing pad assembly 120, namely first and second panels 124a, 124b, are connected to first and second doors 132a, 132b of hatch assembly 130 that enclose and cover box assembly 110 of ground station 100 (see FIG. 1) via hinge pin assemblies 125 mounted to upper portions of the outer surface of the respective first and second panels 124a, 124b. Each hinge pin assembly 125 includes a hinge pin 125a that extends between and is supported by hinge posts 125b mounted on the outer surface of the respective first or second panel 124a, 124b. Hinge pin assembly 125 secures to female sliding hinge assemblies 134 of hatch assembly 130 (see FIG. 17). The outer surface of outer face plates 124x of each of auxiliary panel 124 further includes male sliding hinge assemblies 127 that are similar to female sliding hinge assemblies 134 of hatch assembly 130, but include a male hinge 127a instead of female hinge 134c. Indeed, each male sliding hinge assembly 127 includes male hinge 127a, a slider 127b, and a track 127c.

Male hinge 127a of male sliding hinge assembly 127 has a cylindrical free end 127d that is closed and hollowed with a pin hole 127e extending transversely therethrough. Pin hole 127e receives a pin 129 therethrough (FIG. 3) to couple male hinge 127a to support bar brackets 114m of frame assembly 114 and landing pad assembly 120 to frame assembly 114 to facilitate vertical sliding and pivoting movement of landing pad assembly 120 relative to frame assembly 114 as landing pad assembly 120 moves between collapsed and extended positions thereof.

Each hinged corner panel 126 of landing pad assembly 120 includes a first panel portion 126a, a second panel portion 126b, and corner hinge plate 126c that couples first and second panel portions 126a, 126b together. Each panel portion of first and second panel portions 126a, 126b includes an outer segment 126d and inner segment 126e that are secured together.

Actuators 128 of landing pad assembly 120 are mounted to frame assembly 114 of box assembly 110 and are movable between a retracted position (FIG. 3) and an extended position (FIG. 19) to move landing pad assembly 120 between collapsed (FIG. 3) and extended positions (FIG. 1).

Figure 3:
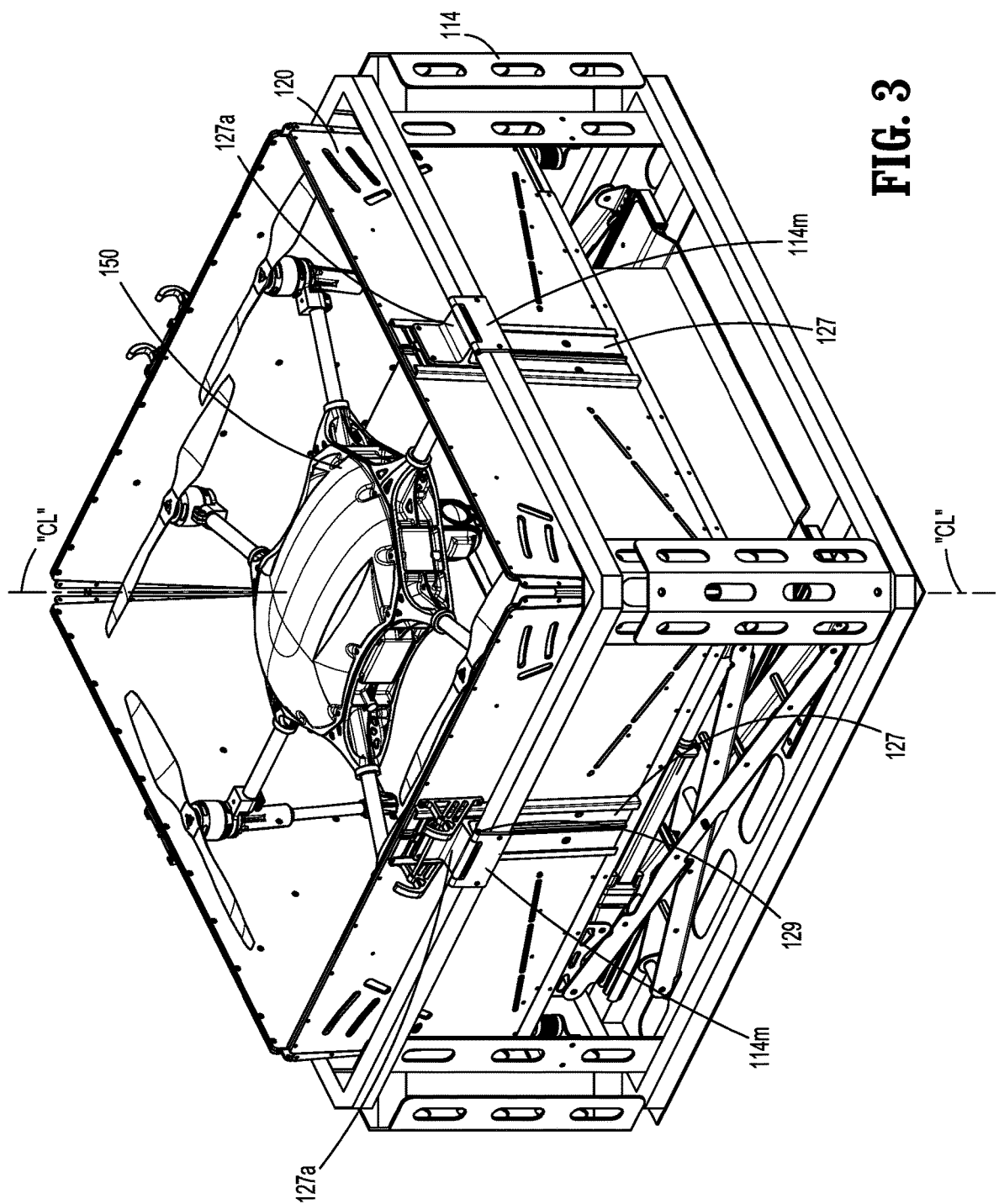
FIG. 3 is a perspective view of the ground station as illustrated in FIG. 2 and supporting a UAV system, the ground station shown with portions thereof removed for clarity.
Figure 4:
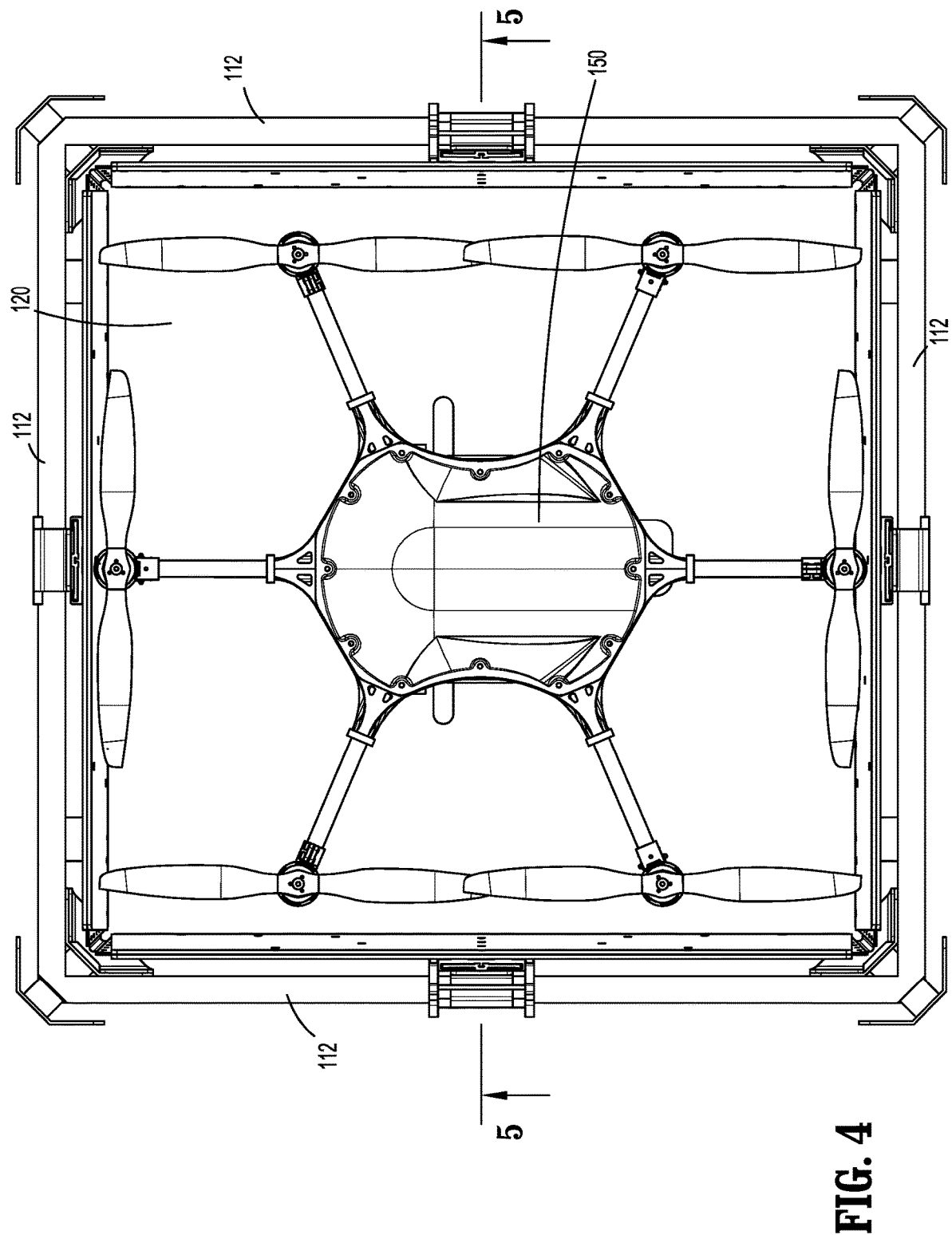
FIG. 4 is a top view of FIG. 3.
Figure 5:
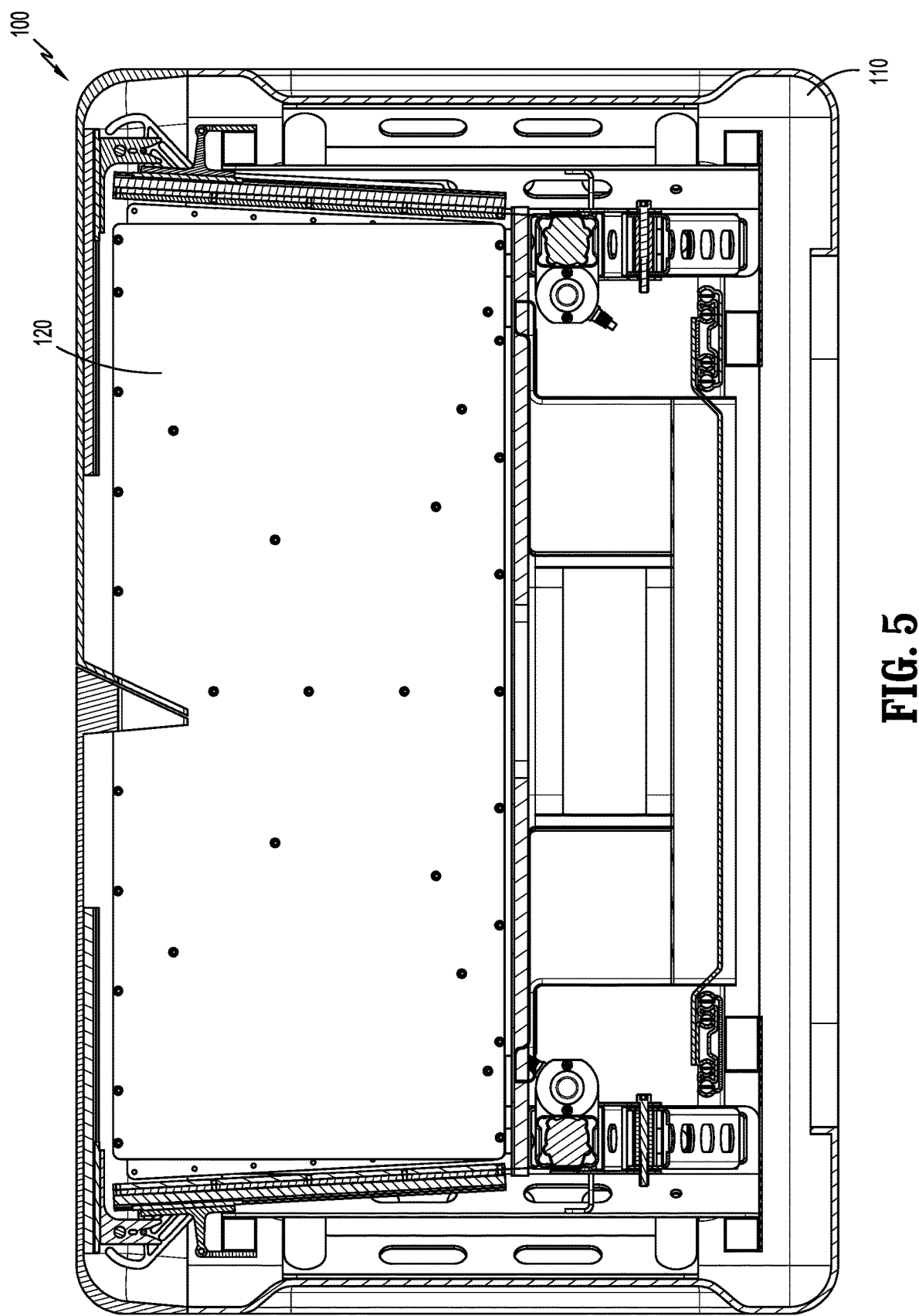
FIG. 5 is a cross-sectional view of FIG. 4 as taken along section line 5-5.

In the collapsed position, landing pad assembly 120 is disposed within a periphery of box assembly 110 such that auxiliary panels 124 and corner panels 126 are parallel to a centerline "CL" of ground station 100 (FIG. 3). In the extended position, auxiliary panels and corner panels 126 of landing pad assembly 120 extend outwardly beyond the periphery of box assembly 110 such that auxiliary panels 124 and corner panels are disposed transverse to the centerline "CL" of ground station 100.

Actuators 128 effectuate a vertical motion of landing pad 122 causing auxiliary panels 124 to pivot about hinge pins 129 to enable auxiliary panels 124 and corner panels 126 to move to between their respective extended or retracted/collapsed positions. Actuators 128 include pivotable arm members 128a, 128b that are pivotably coupled together, a lower mounting plate 128c to which arm member 128b is pivotably coupled, a motor 128d, a controller or computing device 128e, and a drive mechanism 128f that is actuatable (e.g., rotatable) by motor 128d to cause pivotable arm members 128a, 128b to raise and/or lower one another relative to lower mounting plate 128c (e.g., drive mechanism 128f can include a threaded rod that rotates to cause a coupling member 128h of arm member 128a to advance therealong). As can be appreciated, controller 128e can be in communication with the various components of actuator 128 (e.g., motor 128d) to cause actuator 128 to operate for effectuating the opening and/or closing of ground station 100 and/or components thereof. Lower mounting plate 128c is secured to the base of frame assembly 114, and upper mounting plate 128g of actuator 128 couples to landing pad 122. Actuators 128 can be powered using any suitable power source such as a power cable or battery (not shown) in communication with controller 128e, motor 128d, and/or other components of ground station 100.

As illustrated in FIGS. 21-26, when landing pad assembly 120 moves downwardly (e.g., via a scissor action as described for example in U.S. patent application Ser. No. 16/928,195 incorporated by reference above, or via other linear motion methods), the auxiliary panels 124 naturally fold at the hinge. As auxiliary panels 124 fold inwards, corner panels 126 are forced to retract into auxiliary panels 124.

Further, as the auxiliary panels 124 fold inward, the landed UAV 150 (e.g., sUAS) is automatically, and passively, centered on landing pad 122. Finally, as the landing pad 122 reaches the end of its downward travel, the hatch assembly 130 is closed, creating a weather proof seal (see FIG. 2). Advantageously, the folding/collapsible landing pad assembly 120 provides for a large landing pad 122 that can accommodate precision landing tolerances, passively center the UAV 150 without the need for an external centering mechanism, and can reduce the size of the landing pad 122 to the minimum required to house, charge, and deploy the UAV of a particular size (e.g., a sUAS). In turn, this enables the area ratio between the UAV 150 and ground station 100 to be much smaller, thereby reducing weight and increasing the portability of the system as a whole, namely, where the ground station system includes UAV 150 and ground station 100.

Also advantageously, the use of a semi-independent landing pad assembly 120 provides for compatibility with the many sUAS system types. Although landing pad 122 for a tethered sUAS is generally depicted, evidenced by the tether slot 12c through which the tether 140 passes, non-tethered use is contemplated. Tether spool 122d is mounted on the underside of landing pad 122. To switch the system to non-tethered use, landing pad 122 is modularly replaceable with a different landing pad (e.g., one which can support non-tethered flights, or one which can support continuous flights via storage, charging and deployment of at least two drones inside one ground station).

It should be understood that the disclosed structure can include any suitable mechanical, electrical, and/or chemical components for operating the disclosed system or components thereof. For instance, such electrical components can include, for example, any suitable electrical and/or electromechanical, and/or electrochemical circuitry, which may include or be coupled to one or more printed circuit boards. As appreciated, the disclosed computing devices and/or server can include, for example, a "controller," "processor," "digital processing device" and like terms, and which are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In some aspects, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeB SD, OpenB SD, NetB SD®, Linux, Apple® Mac OS X Server®, Oracle® Solaris®, Windows Server®, and Novell® NetWare®. In some aspects, the operating system is provided by cloud computing.

In some aspects, the term "controller" may be used to indicate a device that controls the transfer of data from a computer or computing device to a peripheral or separate device and vice versa, and/or a mechanical and/or electromechanical device (e.g., a lever, knob, etc.) that mechanically operates and/or actuates a peripheral or separate device.

In aspects, the controller includes a storage and/or memory device. The storage and/or memory device is one or more physical apparatus used to store data or programs on a temporary or permanent basis. In some aspects, the controller includes volatile memory and requires power to maintain stored information. In various aspects, the controller includes non-volatile memory and retains stored information when it is not powered. In some aspects, the non-volatile memory includes flash memory. In certain aspects, the non-volatile memory includes dynamic random-access memory (DRAM). In some aspects, the non-volatile memory includes ferroelectric random-access memory (FRAM). In various aspects, the non-volatile memory includes phase-change random access memory (PRAM). In certain aspects, the controller is a storage device including, by way of non-limiting examples, CD-ROMs, DVDs, flash memory devices, magnetic disk drives, magnetic tapes drives, optical disk drives, and cloud-computing-based storage. In various aspects, the storage and/or memory device is a combination of devices such as those disclosed herein.

In various aspects, the memory can be random access memory, read-only memory, magnetic disk memory, solid state memory, optical disc memory, and/or another type of memory. In various aspects, the memory can be separate from the controller and can communicate with the processor through communication buses of a circuit board and/or through communication cables such as serial ATA cables or other types of cables. The memory includes computer-readable instructions that are executable by the processor to operate the controller. In various aspects, the controller may include a wireless network interface to communicate with other computers or a server. In aspects, a storage device may be used for storing data. In various aspects, the processor may be, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, it is also contemplated that a controller may be remote from the disclosed structure (e.g., on a remote server), and accessible by the disclosed structure via a wired or wireless connection. In aspects where the controller is remote, it is contemplated that the controller may be accessible by, and connected to, multiple structures and/or components of the disclosed system.

The term "application" may include a computer program designed to perform particular functions, tasks, or activities for the benefit of a user. Application may refer to, for example, software running locally or remotely, as a stand-alone program or in a web browser, or other software which would be understood by one skilled in the art to be an application. An application may run on the disclosed controllers or on a user device, including for example, on a mobile device, an IOT device, or a server system.

In some aspects, the controller includes a display to send visual information to a user. In various aspects, the display is a cathode ray tube (CRT). In various aspects, the display is a liquid crystal display (LCD). In certain aspects, the display is a thin film transistor liquid crystal display (TFT-LCD). In aspects, the display is an organic light emitting diode (OLED) display. In certain aspects, on OLED display is a passive-matrix OLED (PMOLED) or active-matrix OLED (AMOLED) display. In aspects, the display is a plasma display. In certain aspects, the display is a video projector. In various aspects, the display is interactive (e.g., having a touch screen or a sensor such as a camera, a 3D sensor, a LiDAR, a radar, etc.) that can detect user interactions/gestures/responses and the like. In some aspects, the display is a combination of devices such as those disclosed herein.

The controller may include or be coupled to a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In various aspects, the controller can be coupled to a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In some aspects, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing various aspects and functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

As can be appreciated, securement of any of the components of the disclosed systems can be effectuated using known securement techniques such welding, crimping, gluing, fastening, etc.

The phrases "in an aspect," "in aspects," "in various aspects," "in some aspects," or "in other aspects" may each refer to one or more of the same or different aspects in accordance with the present disclosure. Similarly, the phrases "in an aspect," "in aspects," "in various aspects," "in some aspects," or "in other aspects" may each refer to one or more of the same or different aspects in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Persons skilled in the art will understand that the structures and methods specifically described herein and illustrated in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. A ground station for an unmanned aerial vehicle (UAV), the ground station comprising:
   a box assembly;
   a hatch assembly pivotably coupled to the box assembly; and
   a landing pad assembly movably coupled to the box assembly, the landing pad assembly including a landing pad and a plurality of auxiliary panels circumscribing a perimeter of the landing pad, the plurality of auxiliary panels connected to the landing pad, at least one of the plurality of auxiliary panels directly coupled to the hatch assembly, the plurality of auxiliary panels movable relative to the landing pad to selectively change a size of a landing area for the UAV.

2. The ground station of claim 1, wherein the landing pad assembly is positioned to move between a collapsed position within a periphery of the box assembly to an extended position beyond the periphery of the box assembly.

3. The ground station of claim 1, wherein at least one of the plurality of auxiliary panels defines a corner panel slot that is configured to receive at least one of the plurality of corner panels therein.

4. The ground station of claim 1, further comprising at least one actuator coupled to the landing pad assembly and the box assembly, the actuator being actuatable to cause the landing pad assembly to move relative to the box assembly.

5. The ground station of claim 1, wherein the plurality of auxiliary panels is pivotably coupled to the hatch assembly by at least one hinge assembly secured to the hatch assembly.

6. The ground station of claim 5, wherein the at least one hinge assembly includes a track and a slider that is slidably movable along the track relative to the landing pad assembly, wherein the hatch assembly includes at least one door, the track secured to the at least one door, the slider coupled to the track.

7. The ground station of claim 1, wherein the plurality of auxiliary panels are pivotably coupled to the landing pad.

8. The ground station of claim 7, wherein the plurality of auxiliary panels is coupled to a plurality of corner panels that couple the auxiliary panels together.

9. The ground station of claim 8, wherein the plurality of corner panels is movable relative to the plurality of auxiliary panels.

10. A ground station system, comprising:
    an unmanned aerial vehicle (UAV); and
    a ground station configured to support the UAV, the ground station including:
    a box assembly;
    a hatch assembly pivotably coupled to the box assembly; and
    a landing pad assembly movably coupled to the box assembly to selectively store the UAV in the box assembly or deploy the UAV from the box assembly, the landing assembly including a landing pad and a plurality of auxiliary panels surrounding the landing pad to define a landing area for the UAV, the plurality of auxiliary panels including a first panel having a first end portion pivotably connected to the hatch assembly and a second end portion pivotably connected to the landing pad.

11. The ground station system of claim 10, herein the UAV is tethered to the ground station.

12. The ground station system of claim 10, further comprising at least one actuator coupled to the landing pad assembly and the box assembly, the actuator being actuatable to cause the landing pad assembly to move relative to the box assembly.

13. The ground station system of claim 10, wherein the first panel is pivotably coupled to the hatch assembly by a hinge assembly secured to the hatch assembly and a hinge pin assembly mounted to the first panel, the hinge assembly and the hinge pin assembly pivotably coupled together.

14. The ground station system of claim 13, wherein the hinge assembly, includes a hinge and a track, the hinge positioned to slide along the track to enable the first panel to move relative to the hatch assembly as the first panel moves relative to the landing pad.

15. The ground station system of claim 10, wherein each of the plurality of auxiliary panels is pivotably coupled to the landing pad.

16. The ground station system of claim 15, wherein the plurality of auxiliary panels is coupled to a plurality of corner panels that couples the plurality of auxiliary panels together.

17. The ground station system of claim 16, wherein the plurality of corner panels is movable relative to the plurality of auxiliary panels.

* * * * *